(12) United States Patent
Chen et al.

(10) Patent No.: US 9,999,823 B2
(45) Date of Patent: Jun. 19, 2018

(54) SYSTEM FOR ANALYZING GOLF SWING PROCESS AND METHOD THEREOF

(71) Applicant: Inxpar Inc., County of Sussex, DE (US)

(72) Inventors: Yan Chen, Shanghai (CN); Jin Chen, Shanghai (CN)

(73) Assignee: Inxpar Inc., Sussex, DE (US)

( * ) Notice: Subject to any disclaimer, the term of this patent is extended or adjusted under 35 U.S.C. 154(b) by 0 days. days.

(21) Appl. No.: 14/996,732

(22) Filed: Jan. 15, 2016

(65) Prior Publication Data

US 2016/0151696 A1 Jun. 2, 2016

(51) Int. Cl.
| | |
|---|---|
| *A63B 69/36* | (2006.01) |
| *A63B 24/00* | (2006.01) |
| *A63B 71/06* | (2006.01) |
| *A63B 47/00* | (2006.01) |

(52) U.S. Cl.
CPC ...... *A63B 69/3614* (2013.01); *A63B 24/0006* (2013.01); *A63B 47/002* (2013.01); *A63B 69/3608* (2013.01); *A63B 69/3658* (2013.01); *A63B 71/0619* (2013.01); *A63B 2071/0647* (2013.01); *A63B 2071/0694* (2013.01); *A63B 2220/05* (2013.01); *A63B 2220/16* (2013.01); *A63B 2220/18* (2013.01); *A63B 2220/30* (2013.01); *A63B 2220/34* (2013.01); *A63B 2220/56* (2013.01); *A63B 2220/803* (2013.01); *A63B 2220/805* (2013.01); *A63B 2220/807* (2013.01); *A63B 2220/833* (2013.01); *A63B 2220/836* (2013.01); *A63B 2230/62* (2013.01)

(58) Field of Classification Search
USPC ........................................................ 473/199
See application file for complete search history.

(56) References Cited

U.S. PATENT DOCUMENTS

| | | | |
|---|---|---|---|
| 2003/0109322 A1* | 6/2003 | Funk .................. | A63B 24/0003 473/222 |
| 2009/0005188 A1* | 1/2009 | Iwatsubo ........... | A63B 24/0003 473/223 |
| 2010/0210377 A1* | 8/2010 | Lock .................. | A63B 24/0003 473/409 |
| 2011/0021280 A1* | 1/2011 | Boroda .............. | A63B 24/0021 473/220 |

* cited by examiner

*Primary Examiner* — Pierre E Elisca

(57) ABSTRACT

A system for analyzing a golf swing process includes a sensor system for simultaneously measuring human body movements, club head trajectories and the ball trajectories; a processor for reading data of the sensor system; synchronizing and processing the data; generating the human body 3D model, the club trajectories and the initial flying trajectory of the ball; and calculating a complete flying trajectory of the ball according to the initial flying trajectory; and a visual device, wherein the visual device provides the integrated display of the human body 3D model, the feet pressures, the club trajectories and the ball trajectories, for tracing the club trajectories according to the ball trajectories, and tracing the human 3D model and the feet pressures according to the club trajectories. A method for analyzing the golf swing process is also provided.

20 Claims, 33 Drawing Sheets

SYSTEM FOR ANALYZING GOLF SWING PROCESS AND METHOD THEREOF

BACKGROUND OF THE PRESENT INVENTION

Field of Invention

The present invention relates to a system for analyzing a golf swing process. Particularly, the present invention relates to a system for analyzing a golf swing process by integrated display of a human body 3D model, feet pressures, club trajectories, and ball trajectories, as well as a method thereof.

Description of Related Arts

In golf, high quality hitting is based on force situations of player body movements. However, as a player, or even a professional coach, it is impossible to capture every detailed movement, not to mention the force situations. Many subtle errors may just miss out, which will hinder improvement of golf skills. After muscle memory is formed, it is more difficult to change the action. Hitting movement of human body is directly reflected in handling the club, while an effect of the club on the ball depends on a process of the club head, because it is the club head which will finally hit the ball. However, during a single swing process, the club head rapidly moves, and a club head trajectory is unobservable by human eyes. Furthermore, a flying trajectory of the ball is an ultimate result of high-quality hitting, but a ball speed is high and a flying distance is long, whose detailed trajectories are unobservable by human eyes.

To solve the above problems, a conventional golf system according to the prior art is as follows.

Based on a high-speed camera, the body posture is analyzed through image capturing, wherein accurate speed and acceleration characteristics are difficult to obtain through image process, and image processing is very time consuming, and cause system delay. It is not able to provide instance feedback to player. This system cannot provide weight pressure data of a player.

Based on micro-sensor technologies, sensors are arranged on a watch strap and clothes for measuring information such as positions and speeds, and a body posture is conjectured through node positions. Because only a partial data of body movement are measured, it is impossible to establish a complete body posture, and it is also impossible to form a model based on a player's actual body condition such as height, hence it is not possible to perform an accurate sport performance evaluation.

Based on pressure membrane technologies, a soft cushion is provided for measuring a force range and tendency of feet on the soft cushion. Because the force is dispersed in the soft cushion, the measurement result only reflect a portion of the real pressure, precise pressure value cannot be obtained by membrane technologies alone. Precise pressure data is import when performing analysis regarding human body muscle and joints and tension calculation and injury prevention.

Based on Doppler radar technologies, the ball is tracked within a long range, which only provides space positions of the ball, without information such as body motion data.

Based on club and ball data collected by high-speed camera or infra-red devices, a golf simulator calculates a ball flight trajectory and projects it with a 3D virtual golf course to emulate a real golf playing experience. However, these type of system are mainly for entertainment purpose, and cannot provide accurate body motion and pressure data, and hence not suitable for formal golf training and coaching.

According to the above schemes, golf movements are analyzed from different aspects, which is greatly conducive to golf training. As mentioned above, the high-quality golf swing is based on the correct body movements, reflected in a good club head trajectory, and is directly shown as a sufficient ball trajectory. However, the above schemes are all based on one to two kinds of measurement techniques isolately, and cannot completely detect body movements, club head trajectory and the ball trajectory at the same time. Even all the above schemes are adopted in training, there is no method for linking the body movements, feet pressures, club head trajectory and the ball trajectory. At that time, a user may open three 3D graphics softwares which respectively reflect the body posture, the forces on the feet, and the flying distance of the ball, and then get confused by how to start. Experienced users may be able to correct their movements by cooperation of the three softwares, but it is inevitable that some interrelated details will be lost.

The present invention puts emphasis on developing a highly-integrated composite golf system for measuring the body postures, the feet pressure, the club heat trajectories and the ball trajectories at the same time by a plurality of sensor technologies; providing simultaneous analysis of the body movements, the club head trajectories and the ball trajectories; building linkages between the body movements, the feet pressure, the club head trajectories and the ball trajectories; and enabling visual presentation.

SUMMARY OF THE PRESENT INVENTION

An object of the present invention is to provide a golf system which simultaneously collecting, synchronously analyzing and visually presenting data of human movements, feet pressures, club trajectories and ball trajectories.

Another object of the present invention is to provide a method for analyzing a golf swing process.

Accordingly, in order to accomplish the above objects, the present invention provides a method for analyzing a golf swing process, comprising steps of:

(1) measuring 9-axis information of human body measuring points by a MEMS (micro-electro-mechanical system), wherein according to MEMS data, acceleration and angular velocity data of a human body are obtained; and by an integrating algorithm, club trajectories and human body rotation angles are obtained;

(2) capturing space positions of a club head and a ball by infrared sensors, wherein according to infrared data, a ball initial flying trajectory, a ball initial flying speed, a ball initial flying angle, a hitting angle and speed of a club, and a club direction are calculated with detected space positions;

(3) obtaining feet pressures by a pressure sensor, and accumulating pressure data for calculating pressure values of feet, wherein forces and foot rotation in all directions are calculated with a differential algorithm;

(4) capturing a body posture by a 3D depth sensor (Kinect), wherein according to Kinect data, points of skeleton data are captured to analysis movement of different body part, such as head, should, hip, leg, knee and etc;

(5) obtaining images of the club head and the ball by a camera, wherein the camera use pixel difference between frames for calculating a second ball initial flying trajectory spin rate and rotation axis by an image processing algorithm;

(6) calculating a complete ball flying trajectory according to the ball initial flying trajectory obtained by the infrared sensors and the camera;

(7) according to measured data, calculating a human body 3D (3-dimensional) model, the feet pressures, the club trajectories and the ball trajectories by a processor;

(8) synchronizing between the human body 3D model and the club trajectories, listing displaying human body 3D model parameters, feet pressure parameters and club trajectory parameters at key times in a table, and further generating curves thereof according to the table;

(9) providing integrated display of the human body 3D model, the feet pressures, the club trajectories and the ball trajectories by displaying the human body 3D model parameters, the feet pressure parameters and the club trajectory parameters in one time coordinate;

(10) instructing a player to pose correct body lines, such as shoulder and hip direction relative to target line, at different key time points (such as impact point) of a golf swing, to achieve a targeted club swing path and attack angle, and eventually generate a specific ball flight trajectories (such as a fade, a drew, or a straight shoot);

(11) according to any one of ball trajectory parameters, analyzing corresponding club trajectory parameters which change the one of the ball trajectory parameters; according to one of the corresponding club trajectory parameters, analyzing corresponding human body 3D model parameters and corresponding feet pressure parameters which change the one of the corresponding club trajectory parameters.

Preferably, the human body 3D model parameters, the feet pressure parameters, the club trajectory parameters and the ball trajectory parameters comprise:

(1) the human body 3D model parameters: spine tilt angles, arm tilt angles, leg tilt angles, head tilt angles, shoulder rotation angles, and hip rotation angles;

(2) the feet pressure parameters: feet supporting force distribution, gravity center shift, and contact of feet and a ground;

(3) the club trajectory parameters: club rotation angles, club head moving speeds, club head directions, and club head space trajectories; and (4) the ball trajectory parameters: a ball initial speed, a ball initial direction, ball initial spin, and ball space trajectories.

In order to accomplish the above objects, the present invention also provides a system for analyzing a golf swing process, which traces club trajectories according to ball trajectories, and traces a human 3D model and feet pressures according to the club trajectories, through integrated display of the human body 3D model, the feet pressures, the club trajectories and the ball trajectories; which also displays human body 3D model data, feet pressure data and club trajectory data in one time coordinate for analyzing the golf swing process;

wherein the system comprises a sensor system for simultaneously measuring human body movements, club head trajectories and the ball trajectories, comprising:

an MEMS (micro-electro-mechanical system) motion connected to shoulders, a hip, wrists and a club for measuring movements and postures of a human body and a club;

a first infrared sensor and a second infrared sensor, wherein the first infrared sensor and the second infrared sensor are respectively placed under and in front of a hitting area of the ball for measuring angles, speeds and directions of the club and speeds as well as directions of a ball;

a pressure sensor for measuring a contact area of feet and a ground, forces on the feet, and rotation conditions of the feet;

a 3D depth camera (Kinect) for capturing movements and postures of human body portions during swing; and a camera system for capturing an initial flying trajectory and a spin condition of the ball after hitting;

a processor connected to the sensor system for receiving data from the sensor system, wherein the processor synchronizes and processes the data for generating a human body 3D (3-dimensional) model, the club trajectories and the initial flying trajectory of the ball; so as to calculate a complete flying trajectory of the ball according to the initial flying trajectory; and a visual device connected to the processor for display of the data and visual presentation of analysis processes, wherein the visual device provides integrated display of the human body 3D model, feet pressures, the club trajectories and the ball trajectories, for tracing the club trajectories according to the ball trajectories, and tracing the human 3D model and the feet pressures according to the club trajectories; and the visual device displays the human body 3D model data, the feet pressure data and the club trajectory data in a same time coordinate.

Preferably, the MEMS comprises an MEMS sensor on a club head for measuring 9-axis information of the club head, and for transmitting club head data though a wireless communication protocol to the processor.

Preferably, the MEMS sensor integrates an accelerometer, a gyroscope and a magnetometer, wherein the MEMS sensor is respectively connected to the shoulders, the hip, the wrists and a club head, with a sampling frequency of hundreds times per second.

Preferably, the MEMS sensor is placed on a side of a club which is near the club head, wherein a fixing sleeve made of silicone or rubber provides a sufficient buffing effect while being a fixing device of the MEMS sensor. Or the MEMS sensor is placed on a back of the club head by gluing. Or the MEMS sensor is placed inside the club head, wherein the MEMS sensor is connected to an antenna attached to the club head for transmitting the data, or connected to a metal shell of the club head as the antenna.

Preferably, the processor calculates a precise club head trajectory by receiving the data transmitted through the wireless communication protocol; and calculates the precise club head trajectory with a high resolution by a 9-axis space algorithm.

Preferably the first infrared sensor comprises a first infrared launcher which launches a first infrared light to a first infrared receiving area; the second infrared sensor comprises a second infrared launcher which launches a second infrared light to a second infrared receiving area;

wherein when the first infrared light launched to the first infrared receiving area is blocked, the first infrared sensor sends a first signal to the processor for generating the club trajectories and the initial flying trajectory; when the second infrared light launched to the second infrared receiving area is blocked, the second infrared sensor sends a second signal to the processor for generating the club trajectories and the initial flying trajectory.

Preferably, the first infrared receiving area comprises a first ball trajectory detecting area, a club trajectory detecting area, a club position detecting area, a ball position detecting area, and a ball output detecting area; the second infrared receiving area comprises a second ball trajectory detecting area, and second club trajectory detecting areas, for collecting corresponding data.

Preferably, the pressure sensor simultaneously measures contacting contours of the feet, stress relative distribution and stress absolute values, wherein the pressure sensor comprises a plurality of pressure sensor modules, and each of the pressure sensor modules comprises:

a load pressure sensor for measuring absolute values of pressures, wherein the load pressure sensor is arranged at a bottom of the pressure sensor as a supporting structure of the entire pressure sensor for providing complete supporting;

a membrane pressure sensor for measuring contours of the feet and the stress relative distribution, wherein the membrane pressure sensor is arranged at a top surface of the pressure sensor for directly providing a pressure detecting point, a soft material covers the membrane pressure sensor for protecting and packaging the membrane pressure sensor without changing pressure distribution applied on the membrane pressure sensor;

a mechanical connection between the load pressure sensor and the membrane pressure sensor, wherein the mechanical connection provides a suitable placing face for the membrane pressure sensor and a suitable connection structure for the load pressure sensor, so as to completely transmitting the pressures to the load pressure sensor; or the membrane pressure sensor directly covers the load pressure sensor; and a shell for packaging, wherein the shell is directly connected to and supports the load pressure sensor, and only provides a vertical supporting force to the load pressure sensor; the shell limits a horizontal displacement of the mechanical connection between the load pressure sensor and the membrane pressure sensor; and the shell provides a mechanical connection structure between the pressure sensor modules.

Preferably, the pressure sensor modules are mechanically connected with each other in parallel for measuring continuous regions, and the processor reads data of the pressure sensor modules in an assignment form.

Preferably, the membrane pressure sensor adopts an integrated membrane for measuring pressures within an area; wherein a plurality of membrane sensor detecting points are arranged on the integrated membrane, and each of the membrane sensor detecting points actually equals to a membrane sensor providing a measuring function; a circuit is integrated on the integrated membrane, and a flat cable is finally provided as an interface; portions of the integrated membrane are hollowed for containing the mechanical connection;

wherein the load pressure sensor adopts pressure strain sheets, wherein four pressure strain sheets are respectively arranged at four corners of the load pressure sensor for supporting the membrane pressure sensor and the connection structure;

wherein the mechanical connection comprises a hard board and a soft cushion, wherein the hard board provides a flat face for placing the integrated membrane, and the hard board is supported by the four pressure strain sheets; the soft cushion covers the integrated membrane, in such a manner that the integrated membrane is between the hard board and the soft cushion for being fixed and protected; and feet pressures are transmitted to the integrated membrane through the soft cushion; the hard board is connected to the soft cushion through a common mechanism comprising bolts, and the connection structure limits a horizontal position of the integrated membrane; and a horizontal position of the connection structure is limited by a shell thereof, while no vertical supporting force is directly provided by the shell;

wherein the shell fixes the four pressure strain sheets on the four corners, and limits horizontal positions of the membrane pressure sensor and the load pressure sensor as well as the horizontal position of the connection structure.

Preferably, the camera system comprises a detachable module, which comprises two left-side camera units and two right-side camera units, so as to observe the ball in different camera angles.

Preferably, the visual device mainly comprises:

a displayer and a projection screen for providing two displaying modes;

wherein the displayer presents the postures of the human body, replays a hitting process of a player, presents the club trajectories, and displays the initial flying trajectory and flying angles of the ball, and displaying a predicted flying trajectory of the ball;

wherein the projection screen displays a simulated course, and presents the flying trajectories of the ball in the simulated course;

wherein display contents of the displayer and the projection screen are exchangeable, so as to displaying an enlarged swing process on the projection screen.

Additionally, the visual device comprises a projection device for projecting a straight line on a ground, so as to real-time display a human body rotation angle within a human visual range, wherein the straight line projected on the ground is a single line, is rotatable for presenting the human body rotation angle, and is within the human visual range.

Preferably, the projection device is a laser launcher.

Preferably, the processor collects human body posture data comprising should rotation angles and hip rotation angles; then the processor calculates an angle of the straight line projected according to collected data; and the processor controls the projection device, in such a manner that the straight line is parallel to a human body portion to be presented.

Additionally, the visual device comprises:

Two LED strips for showing human gravity center distribution, wherein in a human visual range, the two LED strips are respectively arranged on right and left sides for real-time displaying a supporting force ratio of the feet;

wherein each of the two LED strips comprises n LED lights, wherein each of the n LED lights represents the supporting force ratio of (100/n) %, in such a manner that when the supporting force ratio is 100%, all the n LED lights are turned on.

Preferably, the system further comprises:

a rubber mat where the ball is placed, wherein strips with different sizes and directions are distributed within the rubber met for simulating grass; and a TEE structure arranged inside the rubber mat, comprising a TEE, a stepper motor and a sensor, wherein the stepper motor moves the TEE upwards, in such a manner that the TEE extends out of the rubber mat for switching between placing the ball on the rubber mat and on the TEE; the sensor detects whether the TEE is at a desired position, and when the TEE is at the desired position, the stepper motor is stopped.

Preferably, the system further comprises:

a ball releasing mechanism, comprising a ball storage, a rail, a stepper motor, and two sensors, wherein the ball storage comprises a pipe and a tray; the rail is designed for ensuring only one ball each time; the stepper motor drives the rail to move upwards or downwards; the two sensors detects whether the rail is at a desired position, when the rail is at the desired position, the two sensors send a signal for stopping the stepper motor.

wherein the rail is driving by the stepper motor for moving downwards to release the ball, and moves upwards after placing the ball for avoiding interference of ball hitting.

Preferably, the system further comprises:
a golf net for preventing the ball from flying everywhere.
These and other objectives, features, and advantages of the present invention will become apparent from the following detailed description, the accompanying drawings, and the appended claims.

DETAILED DESCRIPTION OF THE PREFERRED EMBODIMENT

Figure 1:
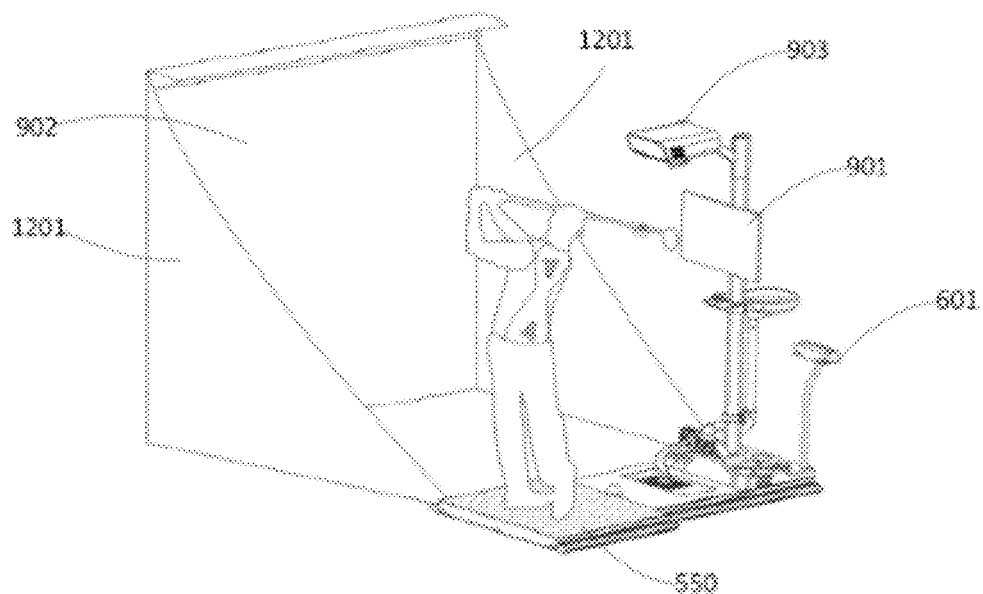
FIG. 1 illustrates a preferred embodiment of a golf system which analyzes a swing process by integrated presentation of body movements, feet pressures, club head trajectories and ball trajectories.
Figure 2:
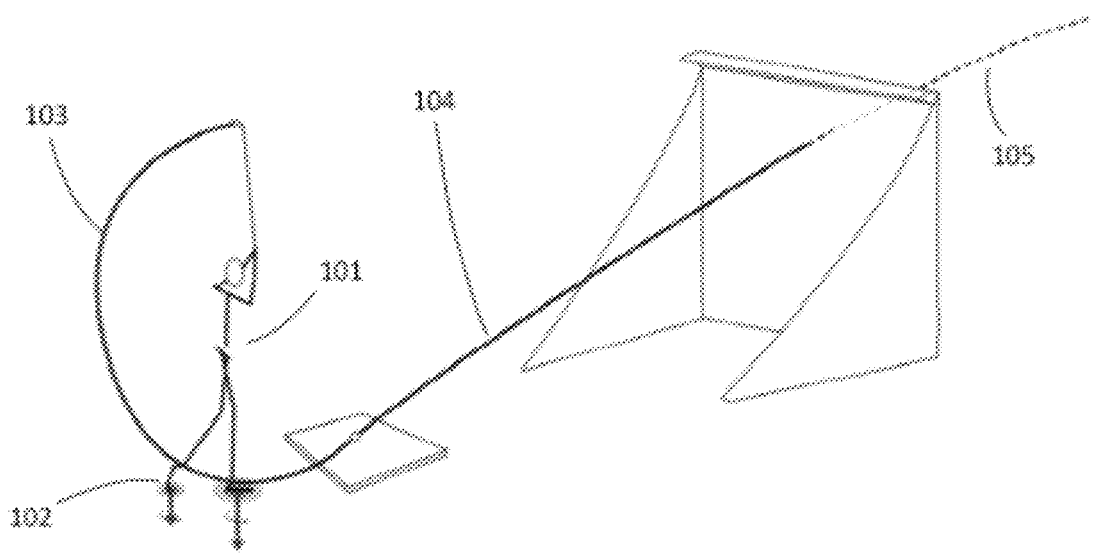
FIG. 2 illustrates a complete human body model of swing, comprising a human body model, feet pressures, club trajectories and ball trajectories.

Referring to the drawings, a system for analyzing a golf swing process according to the present invention is illustrated, which traces club trajectories 103 according to ball trajectories 104, and traces a human 3D model 101 and feet pressure 102 according to the club trajectories 103, through integrated display of the human body 3D model 101, the feet pressure 102, the club trajectories 103 and the ball trajectories 104; which also displays human body 3D model 101 data, feet pressure 102 data and club trajectory 103 data in one time coordinate for analyzing the golf swing process;

wherein the system comprises a sensor system for simultaneously measuring human body movements 101, the feet pressure 102, the club head trajectories 103 and the ball trajectories 104, comprising:

an MEMS (micro-electro-mechanical system) connected to shoulders 301, a hip 302, wrists 303 and a club 304 for measuring movements and postures of a human body and the club;

infrared sensors for measuring angles, speeds and directions of the club and speeds and directions of a ball;

a pressure sensor system 204 for measuring a contact area of feet and a ground, forces on the feet, and rotation conditions of the feet;

a 3D depth sensor (Kinect 205) for capturing movements and postures of human body portions during swing; and high-speed cameras for capturing an initial flying trajectory and a spin condition of the ball after hitting;

a processor connected to the sensor system for reading data of the sensor system, and synchronizing and processing the data; generating the human body 3D model 101, the club trajectories 103 and the initial flying trajectory of the ball; and calculating a complete flying trajectory of the ball according to the initial flying trajectory; and a visual device connected to the processor for display of the data and visual presentation of analysis processes, wherein the visual device provides the integrated display of the human body 3D model 101, the feet pressure 102, the club trajectories 103 and the ball trajectories 104, for tracing the club trajectories 103 according to the ball trajectories 104, and tracing the human 3D model 101 and the feet pressure 102 according to the club trajectories 103; and the visual device displays the human body 3D model 101 data, the feet pressure data and the club trajectory data in the same time coordinate.

System Summary

Figure 3:
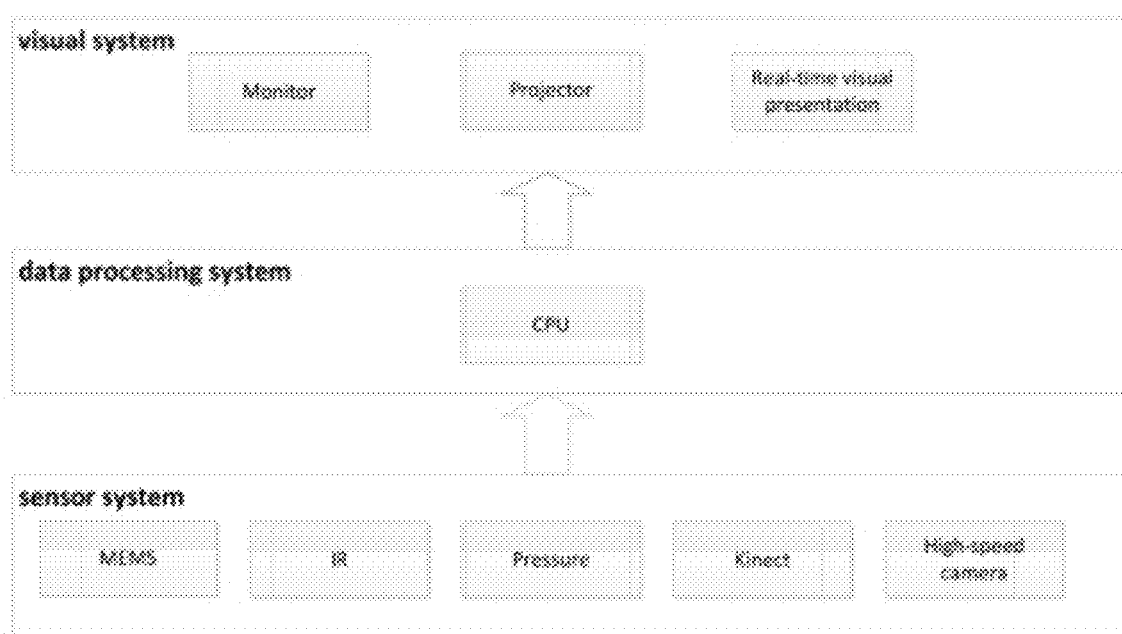
FIG. 3 is a system block diagram of a system for analyzing swing of an embodiment according to the present invention.

FIG. 3 is a system block diagram of a system for analyzing swing of an embodiment according to the present invention. Referring to FIG. 3, a bottom layer is the sensor system, which measures the human body movements, the club trajectories and the ball trajectories in varied methods through the MEMS, infrared, pressures, the Kinect, and the high-speed camera. A middle layer is a data processing system, for reading data of the sensor system, and synchronizing and processing the data; generating the human body 3D model, the club trajectories and the initial flying trajectory of the ball; and calculating a complete flying trajectory of the ball according to the initial flying trajectory. A top layer is a visual device, for simultaneously displaying the swing process and a ball flying process with the displayer and the projection screen. The visual device comprises a real-time visual presentation device, comprising a laser indicating the human body rotation angles and LED strips indicating supporting forces of the feet.

Sensor System

Figure 4:
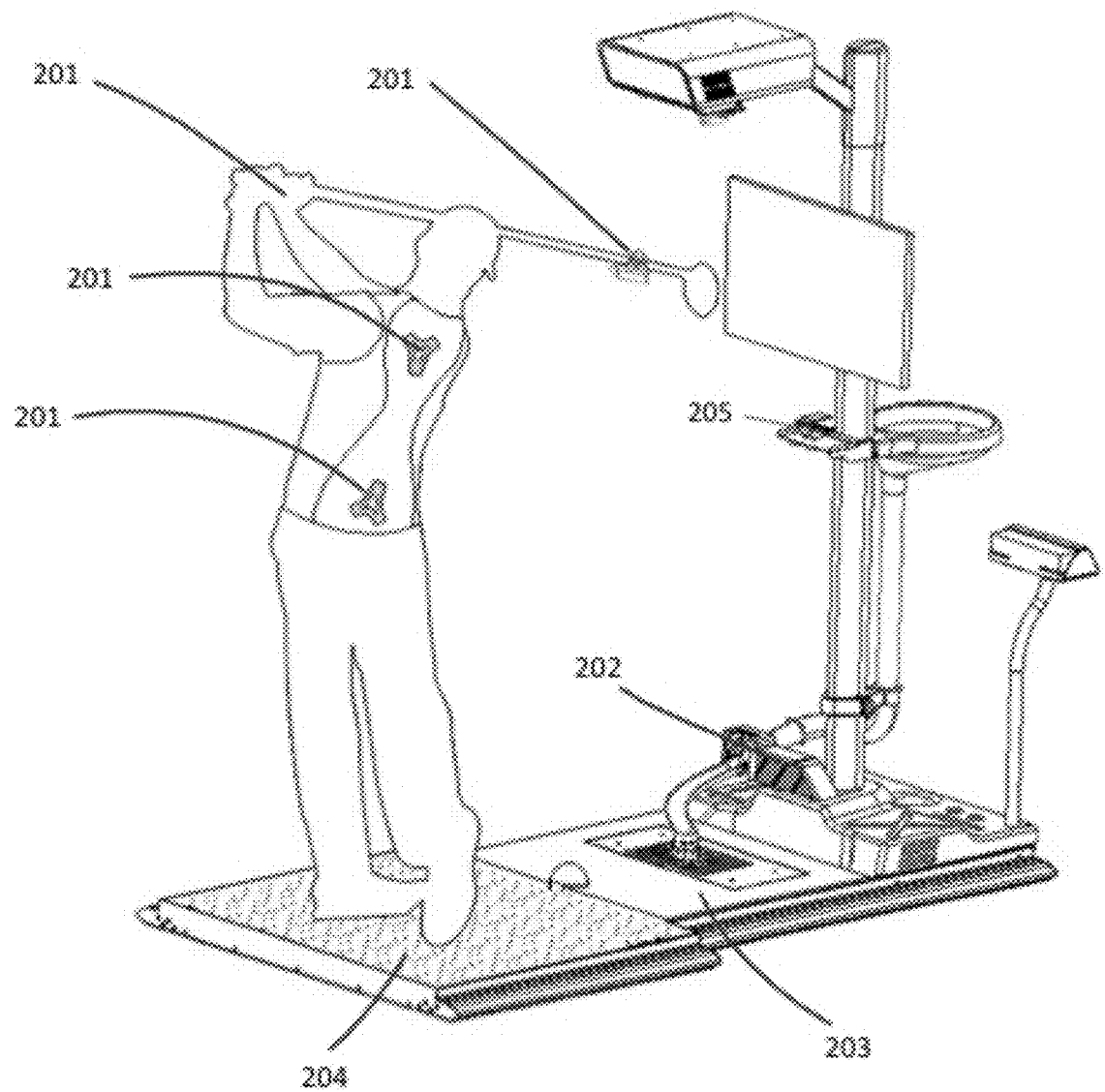
FIG. 4 illustrates placement of a sensor system of the embodiment.

Totally 5 kinds of the sensor technologies are used, comprising: a micro-electro-mechanical system (MEMS) technology, an infrared technology, a pressure sensor technology, a Kinect motion sensing technology, and a high-speed camera movement capturing technology. The present invention take advantages of the above technologies, in such a manner that the above technologies complements each other and closely combined to ensure a high accuracy and diversification of golf data measurement. FIG. 4 illustrates placement of a sensor system of the embodiment. Accordingly, the MEMS sensors 201 are placed on a human body and a club head for collecting data thereof. The infrared sensors and the high-speed camera are integrated in a sensing area 202, wherein a front of the sensing area 202 collects ball and club information. An infrared detecting area 203 is placed under a hitting area for collecting the ball and club information. The pressure sensor 204 is under a human standing position, for measuring pressures and foot contours. The Kinect 205 is placed in front of the hitting area for collecting the human body movement.

Figure 5:
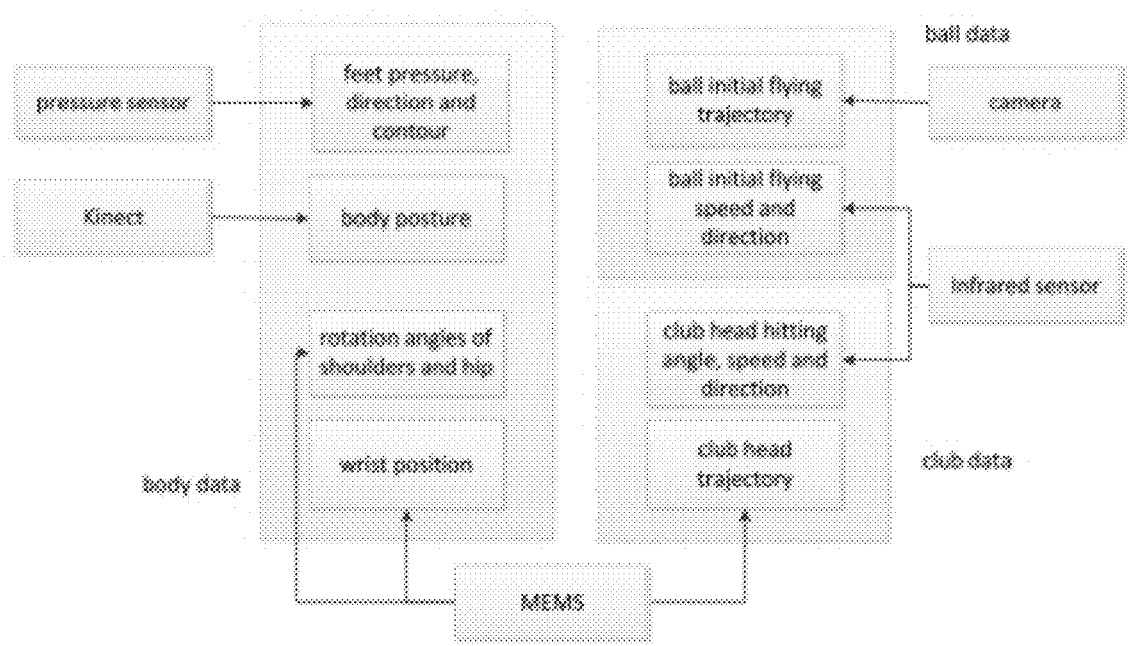
FIG. 5 illustrates collected data from sensors of the embodiment.

FIG. 5 illustrates collected data from sensors of the embodiment. The collected date comprises human body data, club data and ball data. For a same group of data, redundancy data are used for adjusting, so as to reach a higher accuracy.

MEMS Sensor

Figure 6:
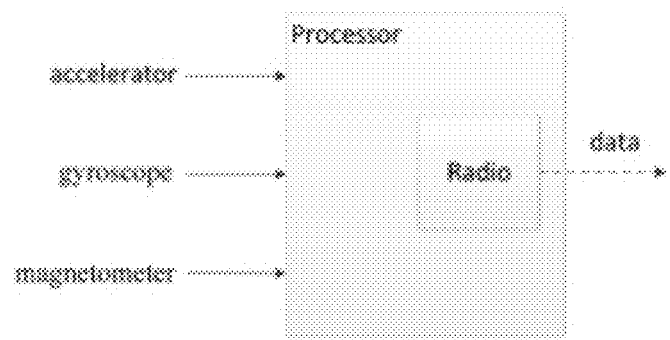
FIG. 6 is a block diagram of an MEMS sensor.
Figure 7:
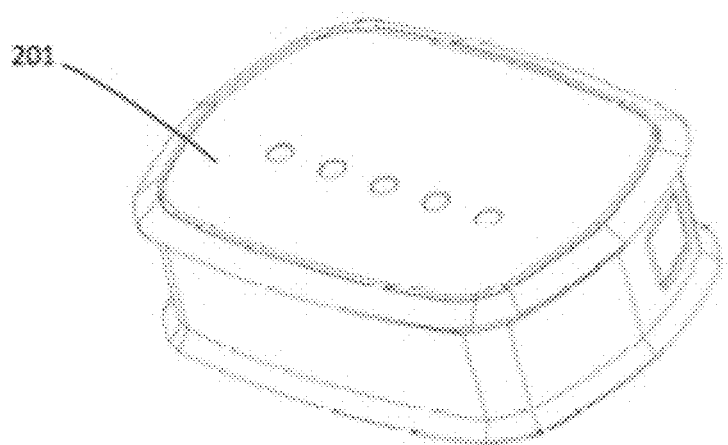
FIG. 7 illustrates a preferred embodiment of an MEMS sensor.

The MEMS sensor 201 integrates an accelerometer, a gyroscope and a magnetometer, which sends the data to a processor through a wireless communication protocol. FIG. 6 is a block diagram of the MEMS sensor 201. And FIG. 7 is a preferred embodiment of an MEMS sensor. The MEMS sensor 201 measures angles, accelerations and angular velocities at each measuring point with a collecting frequency of hundreds times per second.

Figure 8:
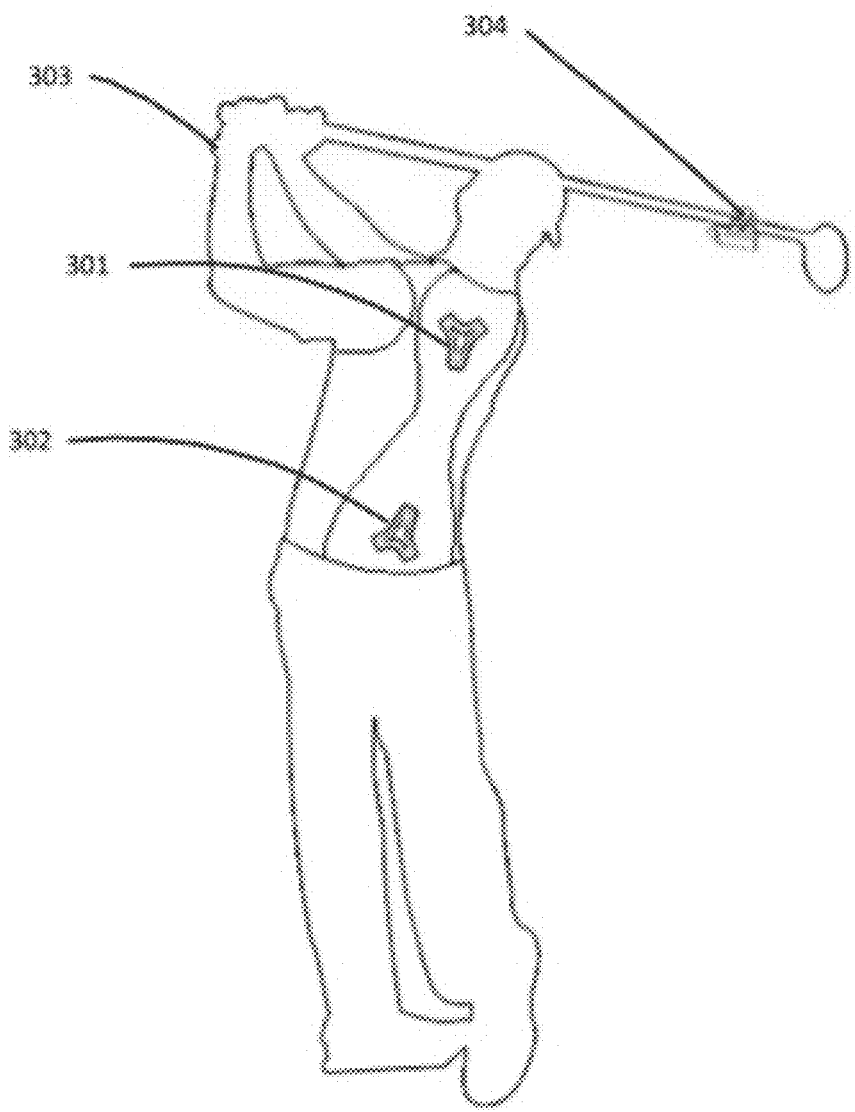
FIG. 8 illustrates placement of the MEMS sensor.

FIG. 8 illustrates placement of the MEMS sensor 201, wherein the MEMS sensor 201 is connected to the shoulders 301, the hip 302, the wrists 303 and the club head 304, for measuring angles, accelerations and angular velocities thereof. For shoulder and hip detection, emphasis is put on rotation angles and directions at a certain time, wherein the human body movements are able to be analyzed according to such data. For wrist and club head detection, emphasis is put on swing angles, trajectories, club head speeds and accelerations, which is quite important for analyzing hitting speeds, directions and ball moving routes.

Figure 9:
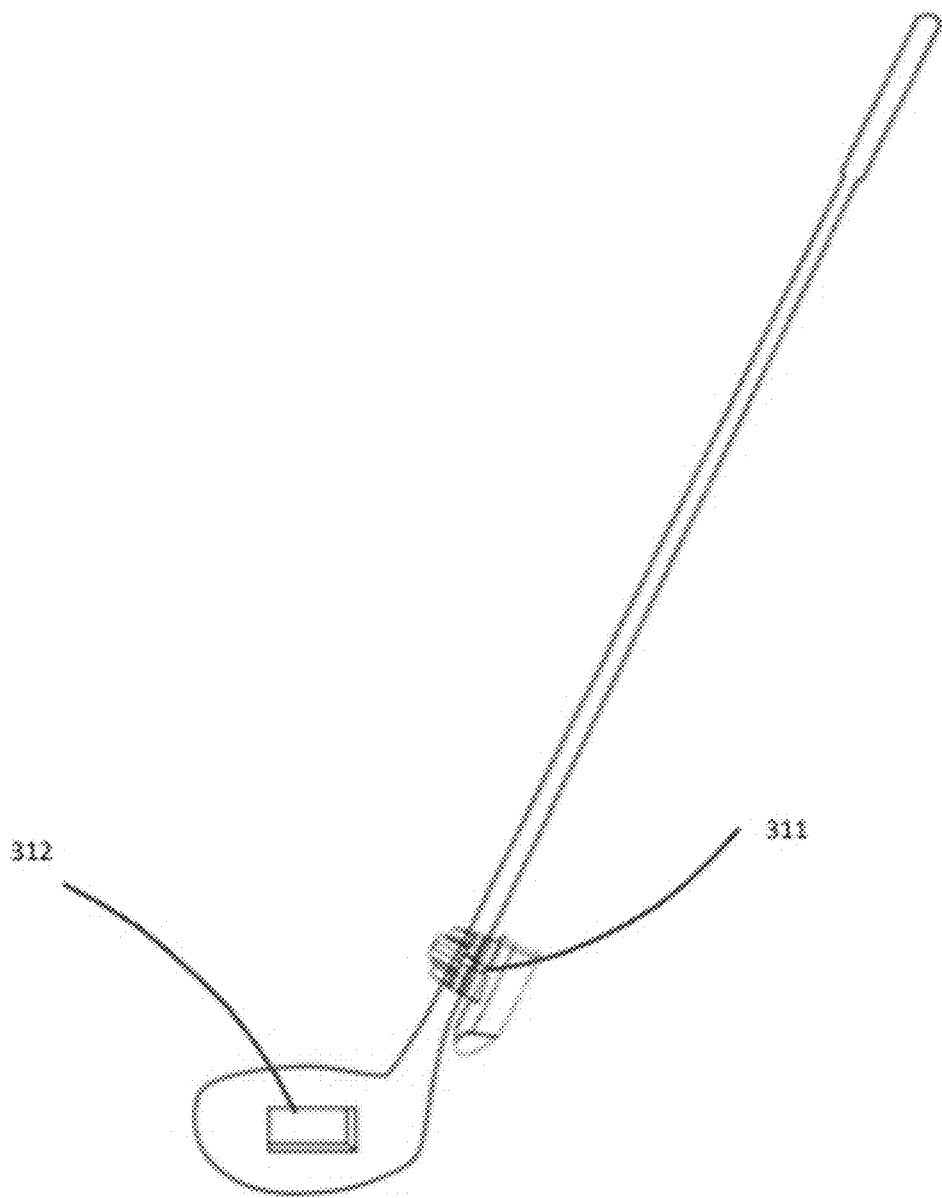
FIG. 9 illustrates placement of the MEMS sensor for measuring club head trajectories.
Figure 10:
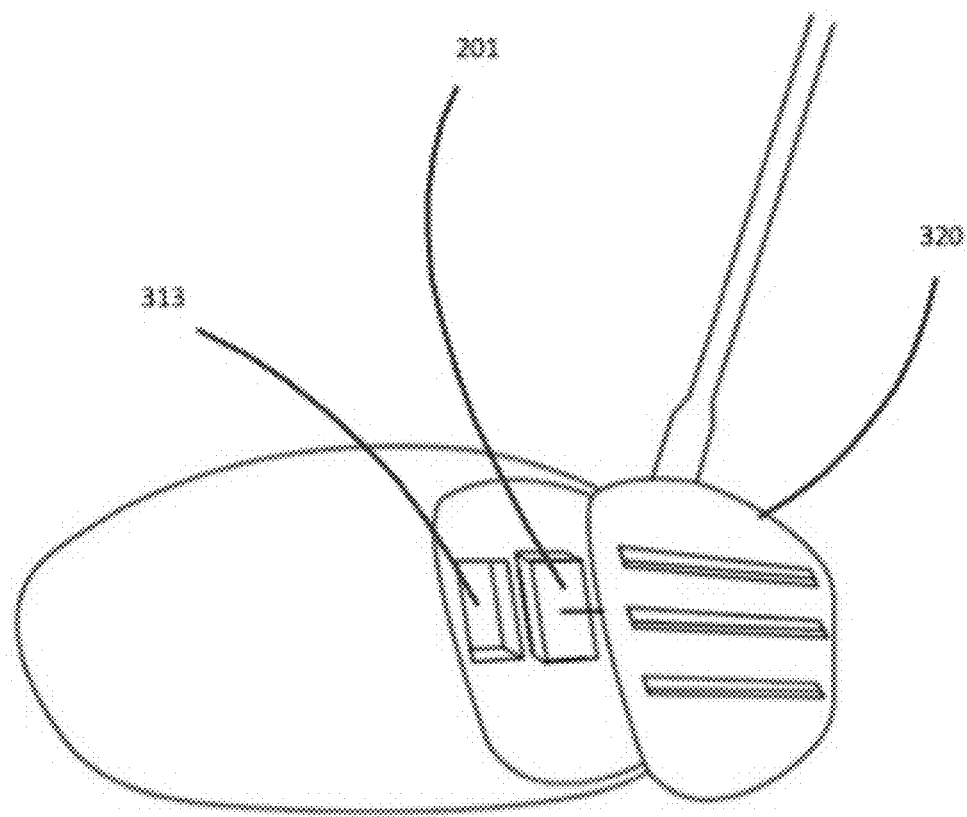
FIG. 10 illustrates one of antenna positions when the MEMS sensor is placed at a club head.

Especially, the MEMS sensor 201 arranged in the club head measures accelerations, angles and directions of the club head for paying attention to a final hitting point of the club and the ball, which is conducive to analyzing effects of the club on the ball. FIG. 9 and FIG. 10 illustrate placement of the MEMS sensor 201 for measuring the club head trajectories, wherein the MEMS sensor 201 is placed on a side 311 of a club which is near the club head, wherein a fixing sleeve made of silicone or rubber provides a sufficient buffing effect while being a fixing device of the MEMS sensor 201. Or the MEMS sensor 201 is placed on a back 312 of the club head by gluing. Or the MEMS sensor 201 is placed at an interior portion 313 of the club head, wherein the MEMS sensor 201 is connected to an antenna attached to the club head for transmitting the data, or connected to a metal shell of the club head as the antenna. FIG. 10 illustrates one of antenna positions when the MEMS sensor is placed at a club head, wherein a portion 320 of the surface of the club is detachable, so as to expose the interior portion 313 where the MEMS sensor 201 is placed.

The MEMS sensor 201 provides 9-axis measurement of the club head, wherein a measuring interval is less than 8 micro second, wherein the club head trajectory is able to be obtained by a 9-axis space algorithm. Because the sampling frequency may be extremely high, an extremely precise club head trajectory with an extremely high resolution is able to be obtained.

Infrared Sensors

After hitting the ball, infrared photodiode and phototransistor sensor technologies are used to measure the ball flying speeds and directions, as well as the club speeds, angular velocities and directions during swing. In addition, the infrared sensors detect whether the ball and the club are at desired potions before hitting, and whether the club passes a certain area.

Figure 11:
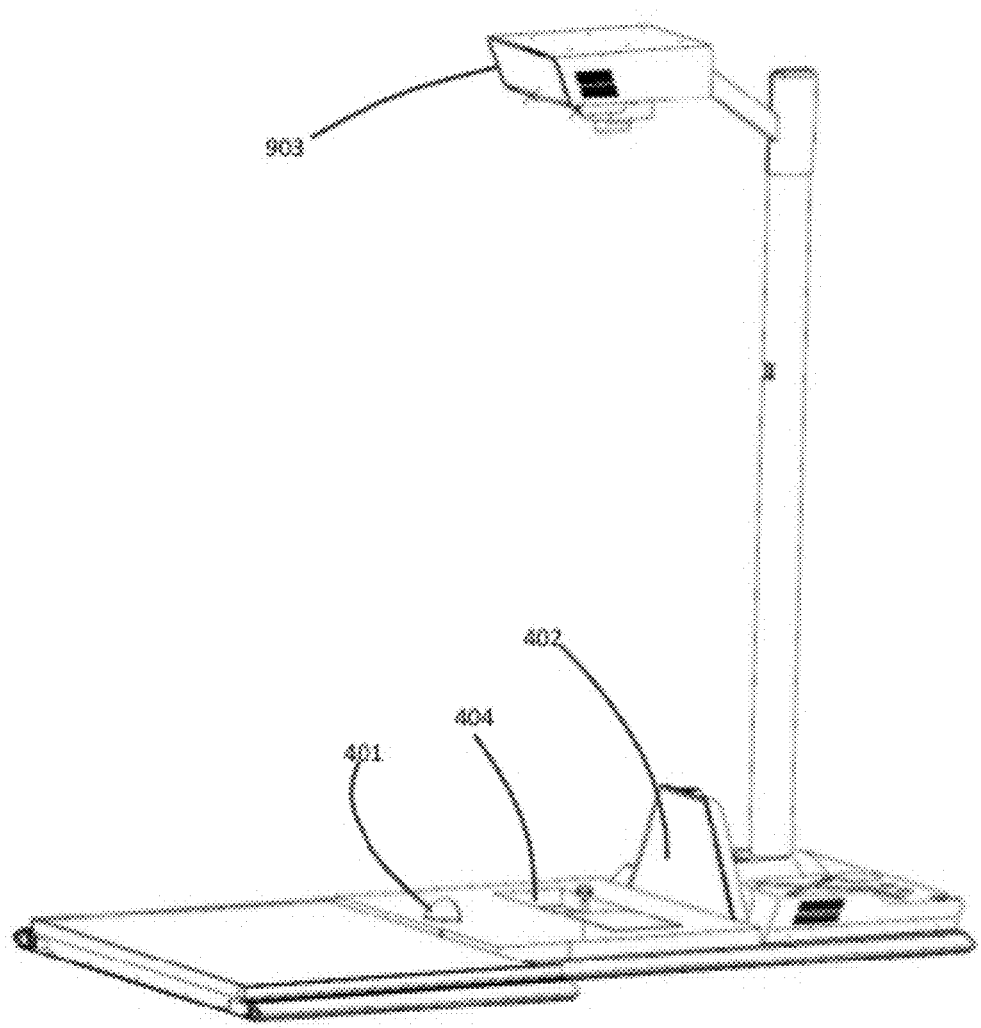
FIG. 11 is a sketch view of an infrared device.
Figure 12:
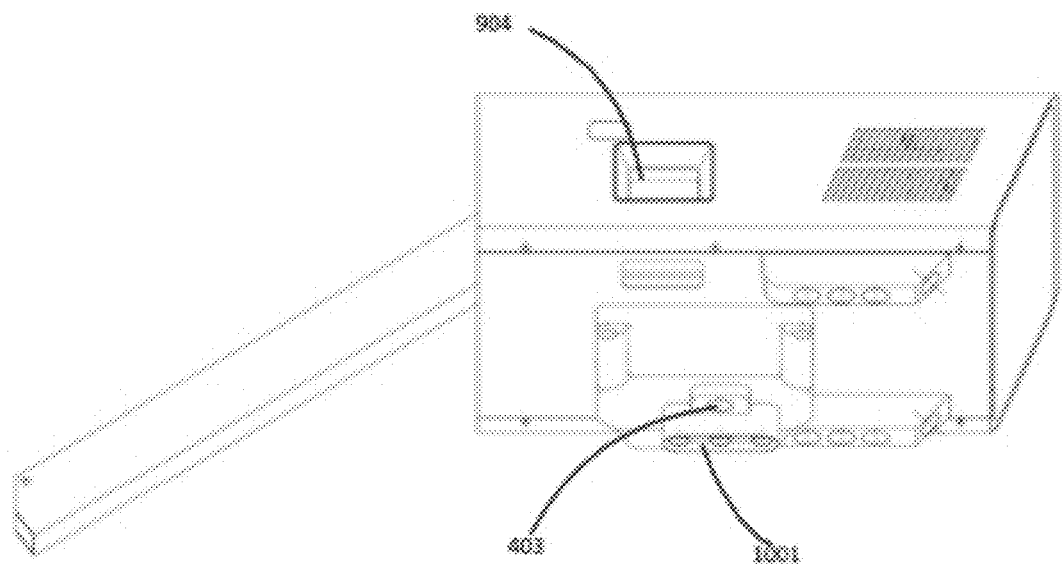
FIG. 12 is a sketch view of a projection equipment, wherein an infrared launcher and a laser launcher are attached under the projection equipment.

FIG. 11 is a sketch view of an infrared device. FIG. 12 is a sketch view of a projection equipment, wherein an infrared launcher and a laser launcher are attached under the projection equipment. The infrared device comprises infrared sources and infrared detecting areas. A first infrared launcher 401 of a first infrared device launches an infrared light to a first infrared receiving area 402. An infrared light from a second infrared launcher 403 is received by a second infrared receiving area 404. An infrared detecting area 415 at a top portion of the first infrared launcher 401 also receives the infrared light from the second infrared launcher 403. A camera area 710 is integrated in the first infrared receiving area 402, and the second infrared launcher 403 is under the projection device 903.

Figure 13:
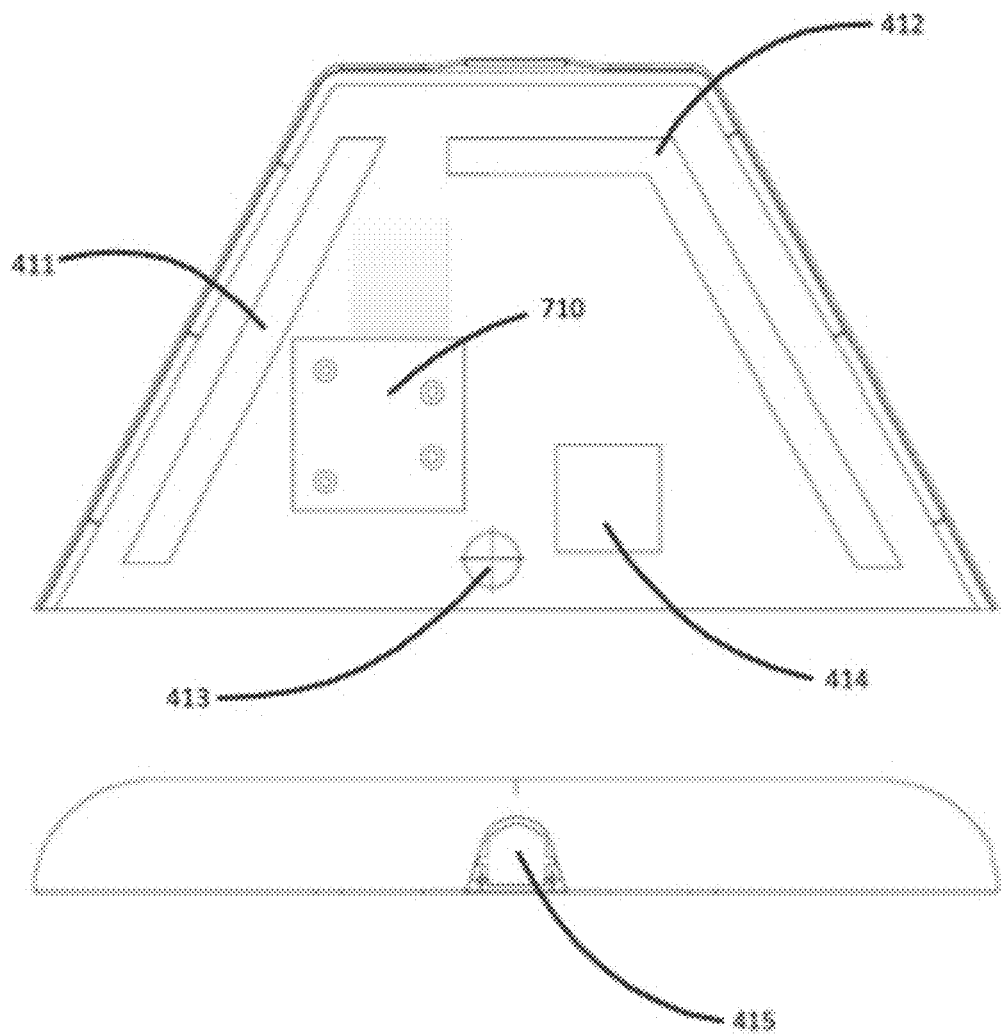
FIG. 13 is sketch views of an infrared detecting area 1 and a camera area.
Figure 14:
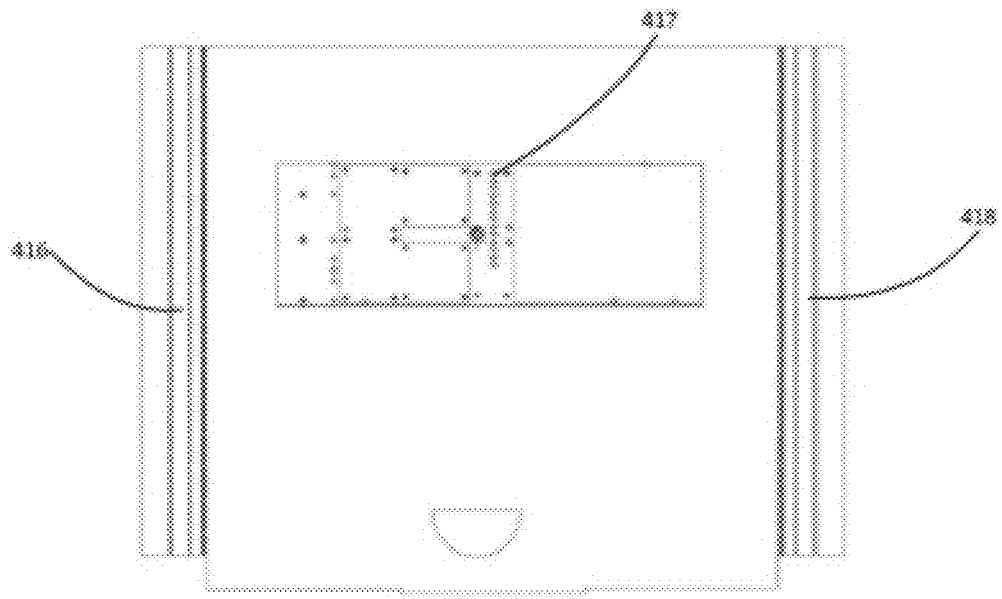
FIG. 14 is a sketch view of an infrared detecting area 2.

FIG. 13 is sketch views of the first infrared receiving area 402, comprising a ball trajectory detecting area 411, a club trajectory detecting area 412, a club position detecting area 414, a ball position detecting area 413, and a ball output detecting area 415. FIG. 14 is a sketch view of the second infrared receiving area 404, comprising a ball trajectory detecting area 416, and club trajectory detecting areas 417, 418.

By setting the infrared sensors in the first infrared detecting area 402 and the second infrared detecting area 404, different functions are able to be achieved.

Figure 15A:
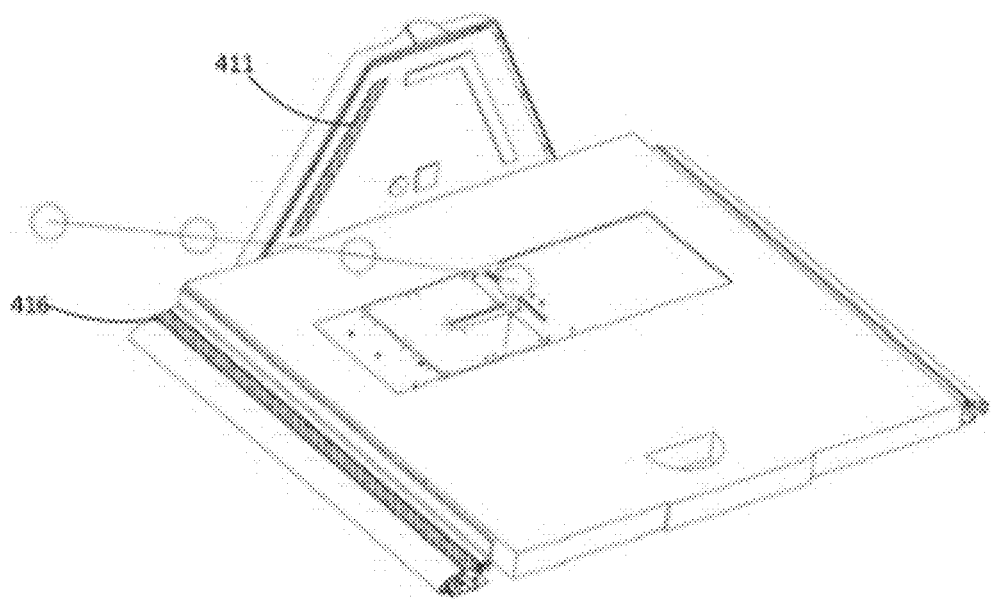
FIG. 15A illustrates a ball infrared detecting function.

FIG. 15A illustrates a ball infrared detecting function, wherein the ball trajectory detecting area 411 measures a ball position projected to the first infrared detecting area 402. The club trajectory detecting area 412 measures a ball position projected to the second infrared detecting area 404.

Figure 15B:
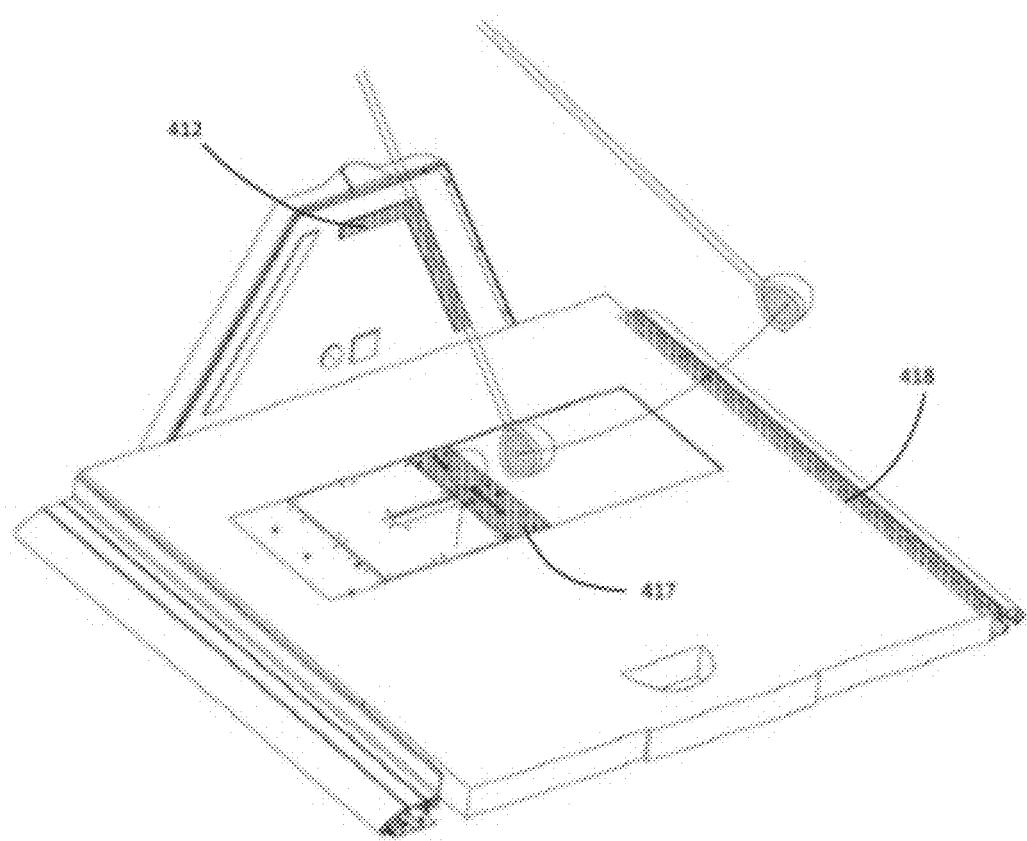
FIG. 15B illustrates a club infrared detecting function.
Figure 15C:
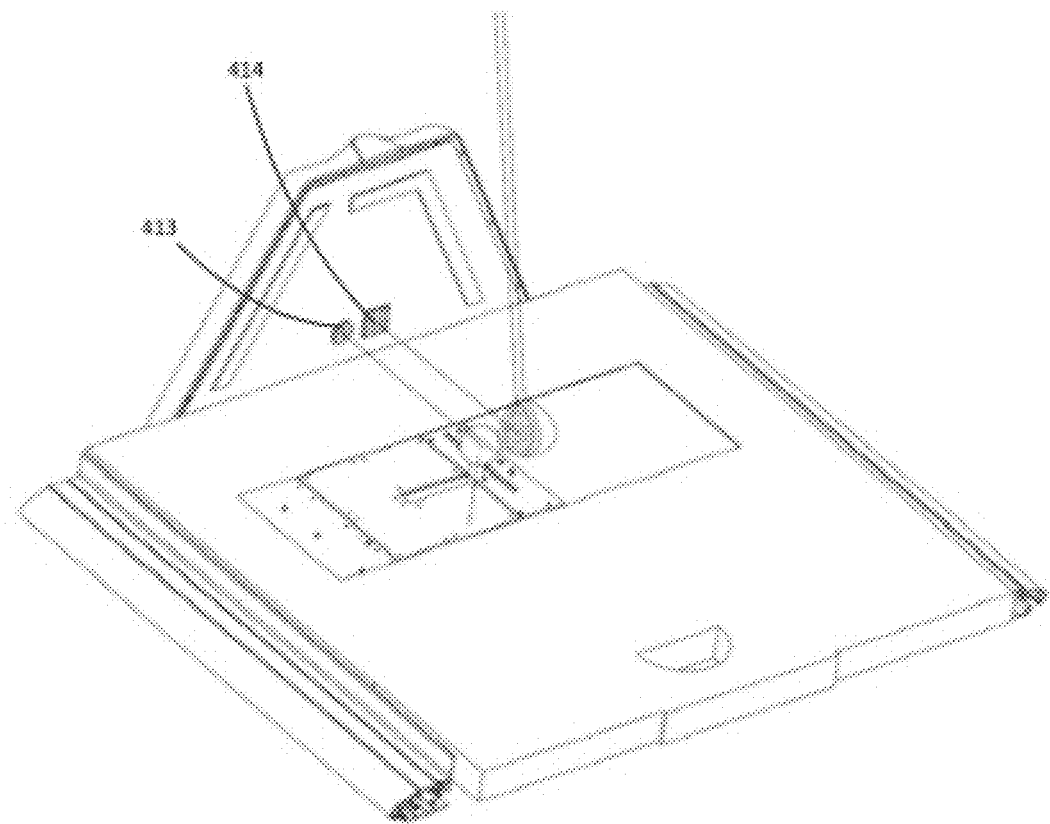
FIG. 15C illustrates a position detecting function of the ball and the club.
Figure 15D:
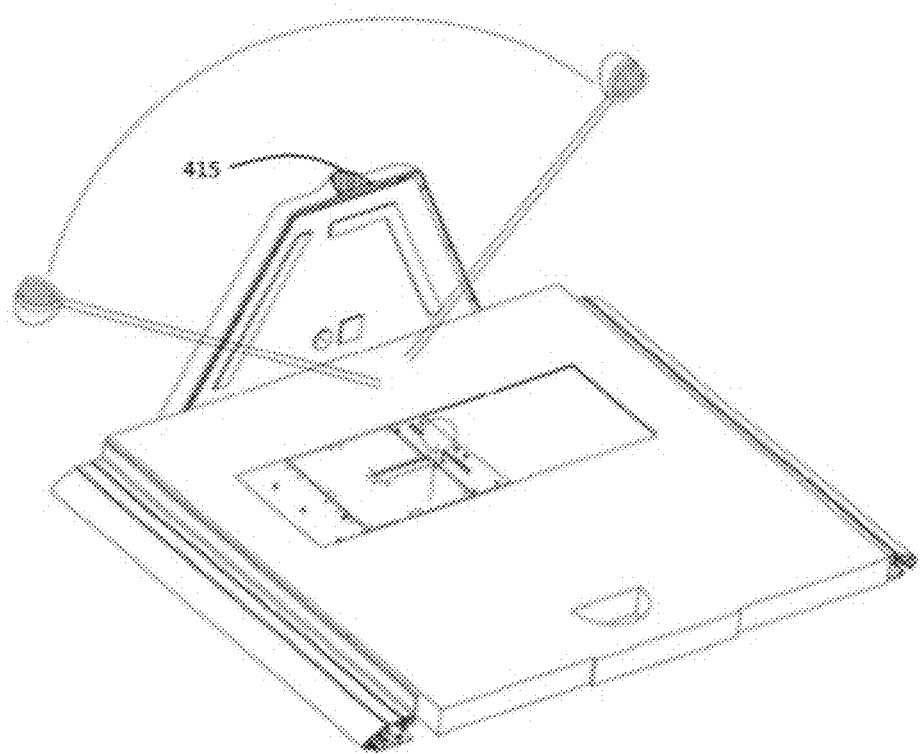
FIG. 15D illustrates a function for swing and outputting the ball.

The ball space position at any time is able to be obtained based on projection information. FIG. 15B illustrates a club trajectory detecting function. FIG. 15C illustrates a position detecting function of the ball and the club, wherein when the infrared lights to the ball position detecting area 413 and the club position detecting area 414 are blocked, the infrared sensor sends a first signal to a controller for indicating that the ball and the club are at desired positions. FIG. 15D illustrates a function for outputting the ball, wherein when the club crosses above the ball output detecting area 415, the infrared sensor sends a second signal to the controller as a ball output signal.

Pressure Sensor

The pressure sensor 204 is used for measuring a contact area of feet and a ground, forces on the feet, and rotation conditions of the feet. Different from measuring steps only by membrane pressure sensors, the pressure sensor 204 combines the load pressure sensor and the membrane pressure sensor 502 for measuring both the contacting contours of the feet and forcing bearing.

From top to bottom, the pressure sensor 204 comprises: a membrane pressure sensor 502 for measuring contours of the feet and the stress relative distribution, wherein the membrane pressure sensor 502 is arranged at a top surface of the pressure sensor 204 for directly providing a pressure detecting point, a soft material covers the membrane pressure sensor 502 for protecting and packaging the membrane pressure sensor 502 without changing pressure distribution applied on the membrane pressure sensor 502; and a mechanical connection 503 between the load pressure sensor and the membrane pressure sensor 502, wherein the membrane pressure sensor 502 provides a suitable placing face and a suitable connection structure for the load pressure sensor, so as to completely transmitting the pressures to the load pressure sensor; or the membrane pressure sensor 502 directly covers the load pressure sensor; a load pressure sensor for measuring absolute values of pressures, wherein the load pressure sensor is arranged at a bottom of the pressure sensor 204 as a supporting structure of the entire pressure sensor 204 for providing complete supporting.

The pressure sensor 204 further comprises a shell 505 for packaging, wherein the shell 505 is directly connected to and supports the load pressure sensor, and only provides a vertical supporting force to the load pressure sensor; the shell 505 limits a horizontal displacement of the mechanical connection 503 between the load pressure sensor and the membrane pressure sensor 502; and the shell 505 provides a mechanical connection structure between the pressure sensor modules.

Figure 16:
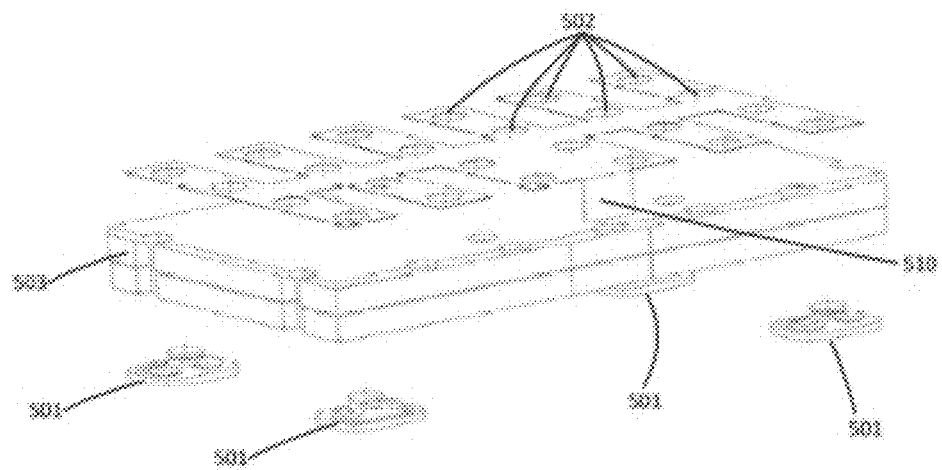
FIG. 16 is a structural view of a pressure sensor.

FIG. 16 is a structural view of the pressure sensor 204, wherein the membrane pressure sensor 502 adopts an integrated membrane 504 for measuring pressures within an area; wherein a plurality of membrane sensor detecting points are arranged on the integrated membrane 504, and each of the membrane sensor detecting points actually equals to a membrane sensor providing a measuring function; a circuit is integrated on the integrated membrane 504, and a flat cable is finally provided as an interface; portions of the integrated membrane 504 are hollowed for containing the mechanical connection 503; wherein the load pressure sensor adopts pressure strain sheets 501, wherein four pressure strain sheets 501 are respectively arranged at four corners of the load pressure sensor for supporting the membrane pressure sensor 502 and the connection structure.

Figure 17:
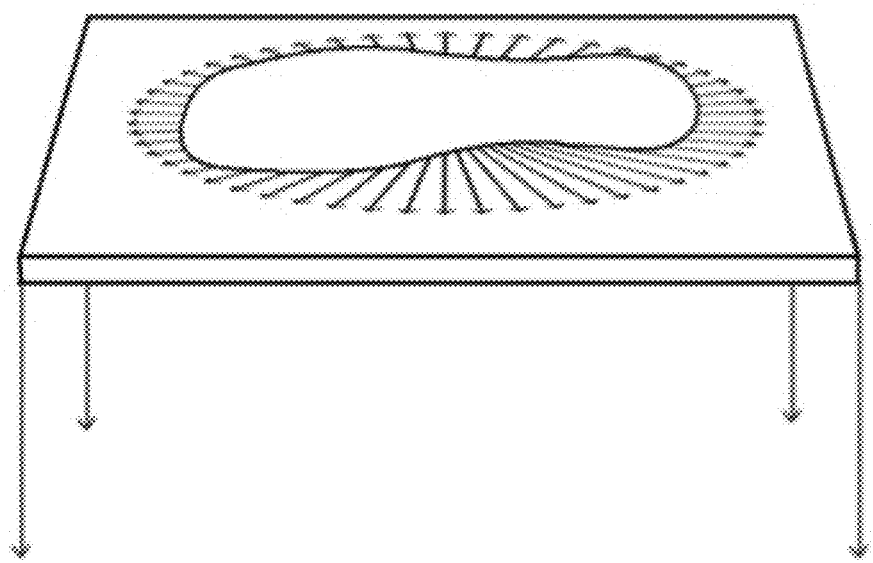
FIG. 17 illustrates a transmitting process of structural force bearing of the pressure sensor.

FIG. 17 illustrates a transmitting process of structural force bearing of the pressure sensor 204. When the feet step thereon, the pressures are dispersed onto the integrated membrane 504, and then transmitted to the mechanical connection 503. The integrated membrane 504 is only a part of the membrane pressure sensor 502. Therefore, the integrated membrane 504 is only capable of sensing the pressure distribution and tendency instead of the pressure itself. The pressure is transmitted to the pressure strain sheets 501 through the mechanical connection 503, in such a manner that pressure values of the pressure strain sheets 501 are added for obtaining an absolute pressure between the feet on the ground.

The pressure sensor 204 is modularized. The pressure sensor modules are expandable by reading data of the pressure sensor modules in an assignment form; connecting the pressure sensor modules with a mechanical structure for measuring continuous regions; and using the pressure sensor modules in parallel for providing a sufficient measuring region.

Figure 18:
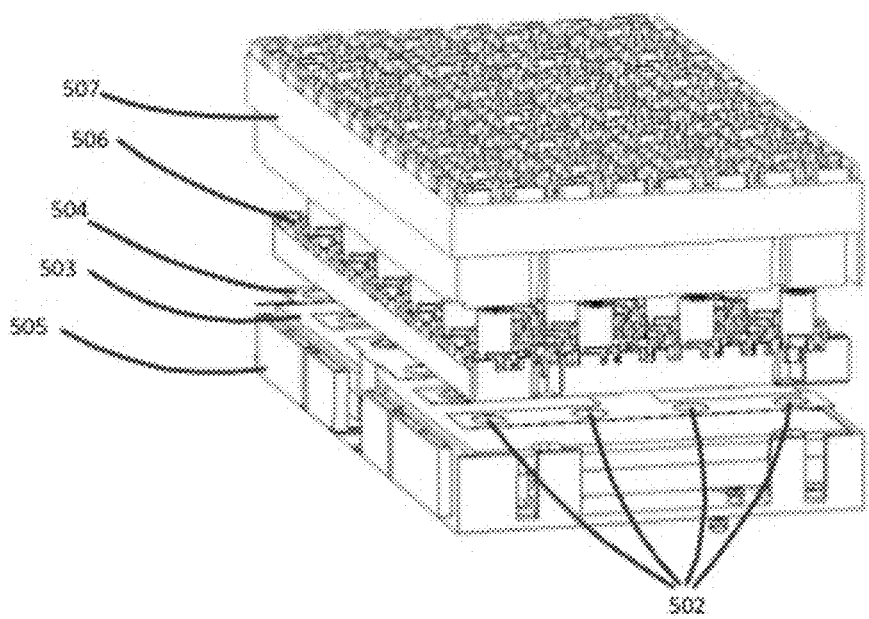
FIG. 18 is a sketch view of modules of the pressure sensor.
Figure 19:
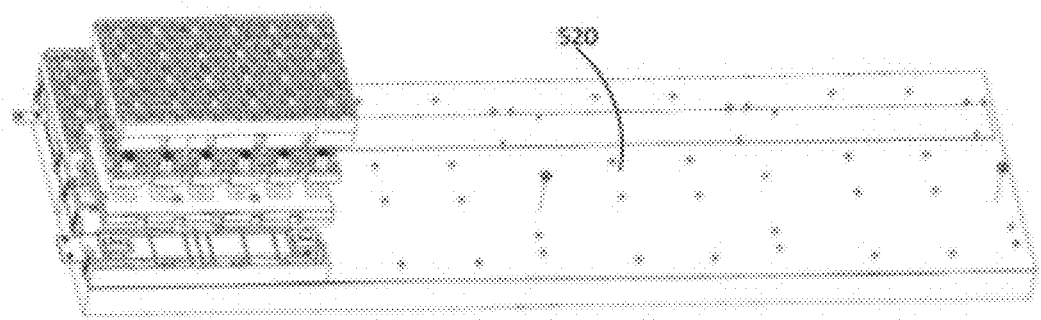
FIG. 19 illustrates expansion of the modules of the pressure sensor.

FIG. 18 is a sketch view of the modules of the pressure sensor 204 as shown in FIG. 16. FIG. 19 illustrates expansion of the modules of the pressure sensor as shown in FIG. 16.

Additionally, the mechanical connection 503 comprises a hard board and a soft cushion, wherein the hard board provides a flat face for placing the integrated membrane 504, and the hard board is supported by the four pressure strain sheets 501; the soft cushion covers the integrated membrane 504, in such a manner that the integrated membrane 504 is between the hard board and the soft cushion for being fixed and protected; and feet pressure 102 are transmitted to the integrated membrane 504 through the soft cushion; the hard board is connected to the soft cushion through a common mechanism comprising bolts, and the connection structure limits a horizontal position of the integrated membrane 504; and a horizontal position of the connection structure is limited by a shell 505 thereof, while no vertical supporting force is directly provided by the shell 505; wherein the shell 505 fixes the four pressure strain sheets 501 on the four corners, and limits horizontal positions of the membrane pressure sensor 502 and the load pressure sensor as well as the horizontal position of the connection structure.

It should be noticed that, selection, settings, module shapes, shell designs, and expanding methods of the membrane pressure sensor and the load pressure sensor are changeable according to requirements. The pressure sensor 204 measures pressure conditions of the feet during swing, but is not limited to such situation. However, the pressure sensor 204 is able to provide large-range pressure conditions of the feet on runways, stadium, etc.

3D Depth Sensor—Kinect

Based on a Kinect motion sensing technology, human skeletons are traced for obtaining human body posture information such as head positions, neck tilt angles, arm positions, arm tilt angles, vertebral column positions, vertebral column tilt angles, leg positions and leg tilt angles during swing. Referring to FIG. 5, an assembly 205 of the Kinect is provided, wherein the Kinect is mounted in front of the human standing position for capturing player skeleton positions during swing. Capturing targets of the Kinect comprises: head, neck, left shoulder, right shoulder, left elbow, right elbow, left wrist, right wrist, left hand, right hand, spine, hip center, left hip, right hip, left knee, right knee, left ankle, right ankle, left foot and right foot, wherein some of the parameters are used for analyzing whether postures of the player is correct. Body parameters during swing are defined as follows: head positions, neck tilt angles, arm positions, arm tilt angles, spine positions, spine tilt angles, leg positions, and leg tilt angles. These parameters are used to define a proper hitting posture, wherein a warning is given on the displayers if any one of the parameters is out of a pre-set range.

High-Speed Camera

Figure 20:
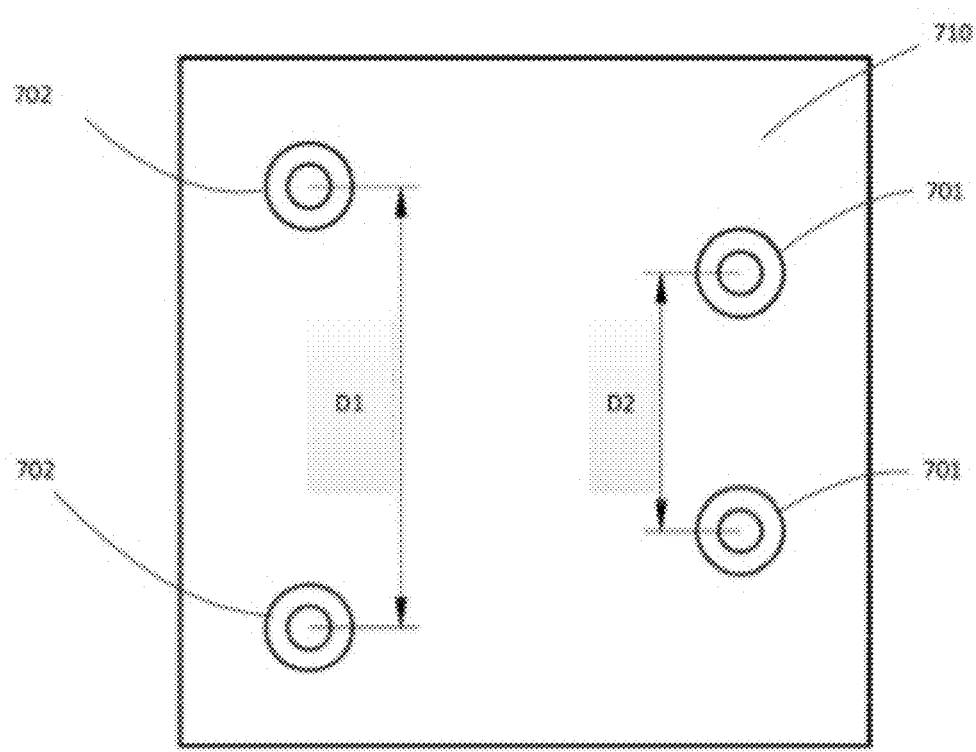
FIG. 20 illustrates camera distribution within a camera area.
Figure 21:
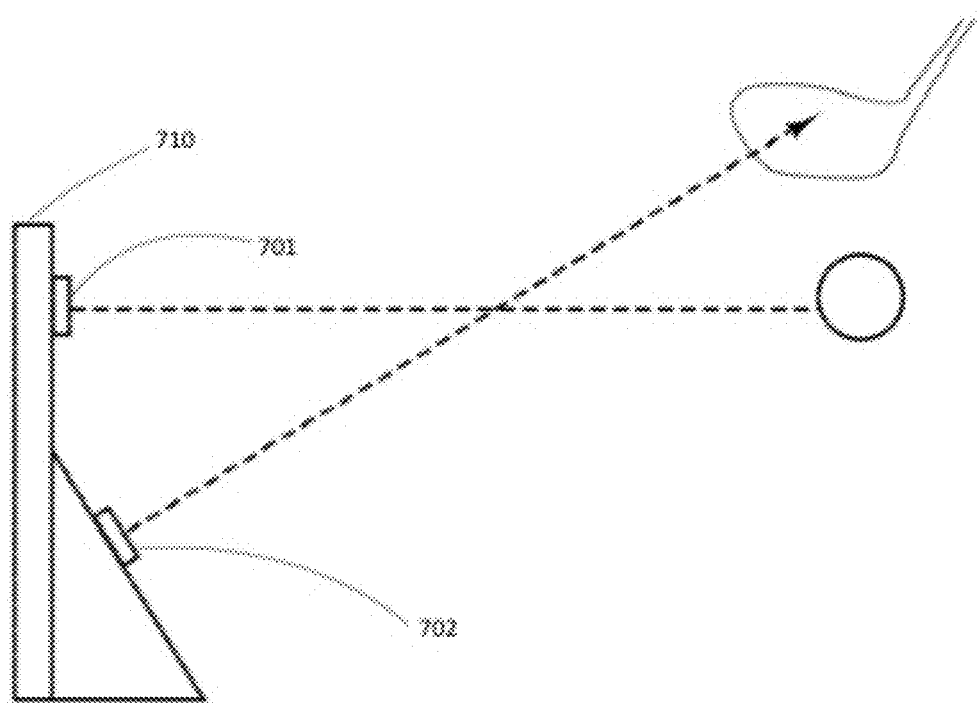
FIG. 21 illustrates functions of the camera.
Figure 22:
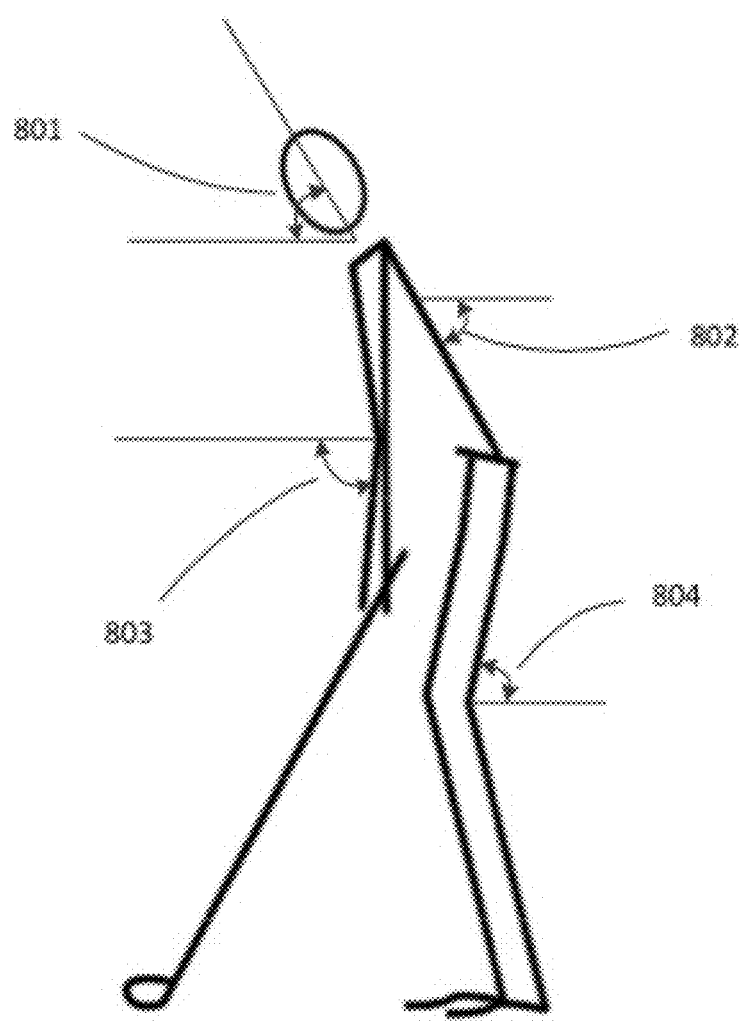
FIG. 22 illustrates a parameter of human body tilt angles.
Figure 23:
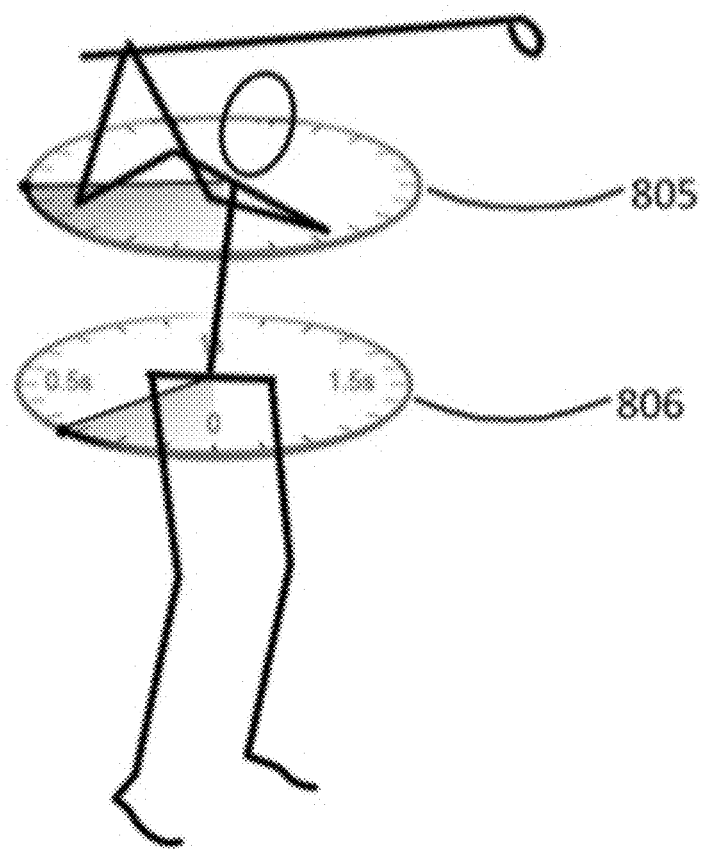
FIG. 23 illustrates a parameter of human body rotation angles.
Figure 24:
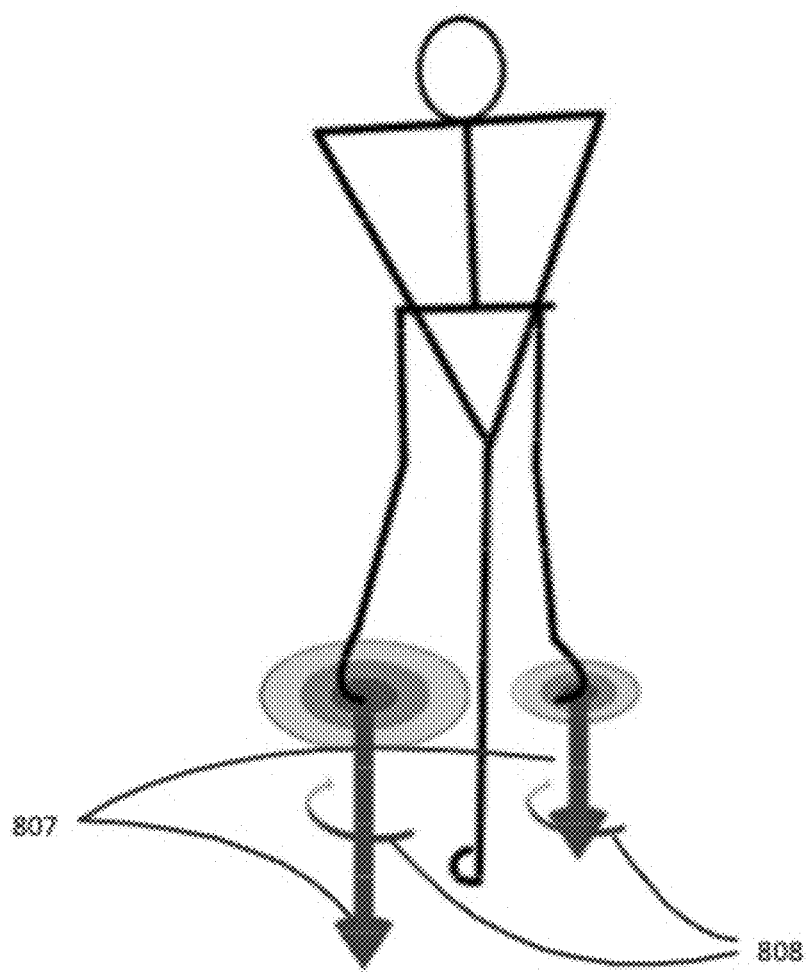
FIG. 24 illustrates a parameter of pressures of the feet.

The high-speed camera captures trajectories and rotations of the club and the ball. FIG. 20 illustrates camera distribution within the camera area 710. FIG. 21 illustrates functions of the camera. Accordingly, four camera units are mounted in the camera area 710, wherein there are two left-side camera units 702 and two right-side camera units 701. A distance between the left-side cameras 702 is d1 while a distance between the right-side cameras 701 is d2. All the cameras are integrated in a single detachable module.

The processor calculates the ball speed and rotation speed by analyzing frame differences. By analyzing differences between the ball positions, the ball speed and direction are able to be calculated. By analyzing tiny differences of ball textures, the ball spin is able to be calculated. By obtaining the ball speed, the ball directions, and rotation information, the ball fly trajectory is further predicted for analyzing a hitting quality.

Data Analyzing System and Analysis Thereof

The processor system handles the data received from the sensor device for generating a human body model, the club head trajectories and ball flying trajectories, and analyzing links therebetween.

Analysis functions of the processor are as follows: (1) data processing, wherein direct physical values collected by the sensors are converted into parameter defining the human body model, parameters defining the club trajectories, and parameters of ball fly trajectories; through algorithms and co-calibration of the sensors, parameter accuracy and stability are improved; (2) data analyzing, wherein defined parameters are analyzed for analyzing information indicated by the parameters, such as whether the human body posture is correct, whether weight distribution is correct, whether club head trajectories are normal, and whether the ball flying trajectories meet requirements; and (3) parameter link analyzing, wherein cooperation relationships between the defined parameters are analyzed, such as a relationship between wrist angles and gravity centers of the feet, a relationship between the human body posture and the club head trajectories, and a relationship the human body posture and the ball flying trajectories.

Preferably, the parameters are defined as follows: (1) the human body model parameters: spine tilt angles 802, arm tilt angles 803, leg tilt angles 804, head tilt angles 801, shoulder rotation angles 805, hip rotation angles 806, supporting force distribution 807 of the feet, gravity center shift, and contact between the feet and the ground; (2) the club trajectory parameters: wrist angles, wrist positions, club rotation angles, club head space positions, club head moving speeds, club head directions 810, and club head space trajectories 809; and (3) the ball trajectory parameters: a ball initial speed, a ball initial direction 812, ball initial spin 814, a ball space trajectory 811, and a ball predicted flying trajectory.

Data processing is as follows: (1) according to MEMS data, acceleration and angular velocity data are obtained; by an integrating algorithm, the club trajectory and the human body rotation angle are obtained; (2) according to infrared data, the ball initial trajectory, the flying speed, the flying angle, a hitting angle and speed of the club, and a club direction are calculated with detection space positions; (3) according to pressure data, strain sheet data are accumulated for calculating pressure values of the left and right feet, forces and foot rotation in all directions are calculated with a differential algorithm; (4) according to Kinect data, jitter points of skeleton data are removed with a filtering algorithm, a custom human body model is regenerated; (5) the high-speed camera use pixel difference between frames for calculating the ball initial flying trajectory and rotation direction by an image processing algorithm; and (6) a complete ball flying trajectory is calculated according to the initial flying trajectory obtained by the infrared sensors and the high-speed camera.

After processing, a series of human body model parameters, club trajectory parameters and ball trajectory parameters as defined above are obtained. Clearly, during the swing process, good hitting means the parameters are limited within a certain range. Data analysis is focused on the parameters after data processing, for analyzing whether the parameters are within the certain range. For the human body model, it is obtained whether the spine tilt angles 802, the arm tilt angles 803, the leg tilt angles 804, the head tilt angles 801, the shoulder rotation angles 805, and hip rotation angles 806 are too large or too small; whether a gravity center is too close to a body side; and whether foot directions and rotation directions 808 are correct. For the club trajectory, it is obtained whether a lowest point of the club is too low, and whether the hitting speed and angle are correct. For the ball trajectory, it is obtained whether the ball initial speed, angle, rotation conditions are correct, and a final landing distance of the ball. The above examples list a series of individual parameter analysis, but not all analytical contents.

Analysis of links between the parameters comprises: (1) data synchronization between the human body model and the club trajectories, wherein parameters at key times are listed in a table, a curve is able to be further generated according to the table; (2) by adjusting the body lines (shoulder, hip, and arm moving directions and angles) of the human body model and the club trajectories, the ball trajectories are predicted; (3) a corresponding human body model and club trajectories are reversely traced according the ball trajectories.

Figure 25:
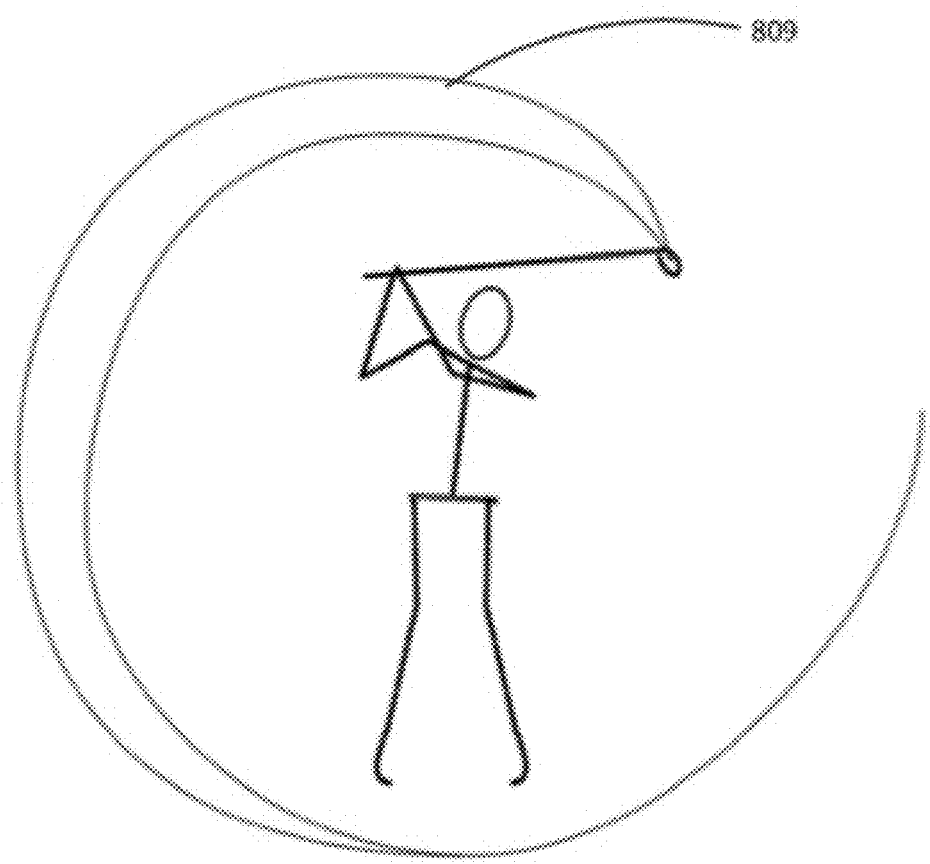
FIG. 25 illustrates a club trajectory.
Figure 26:
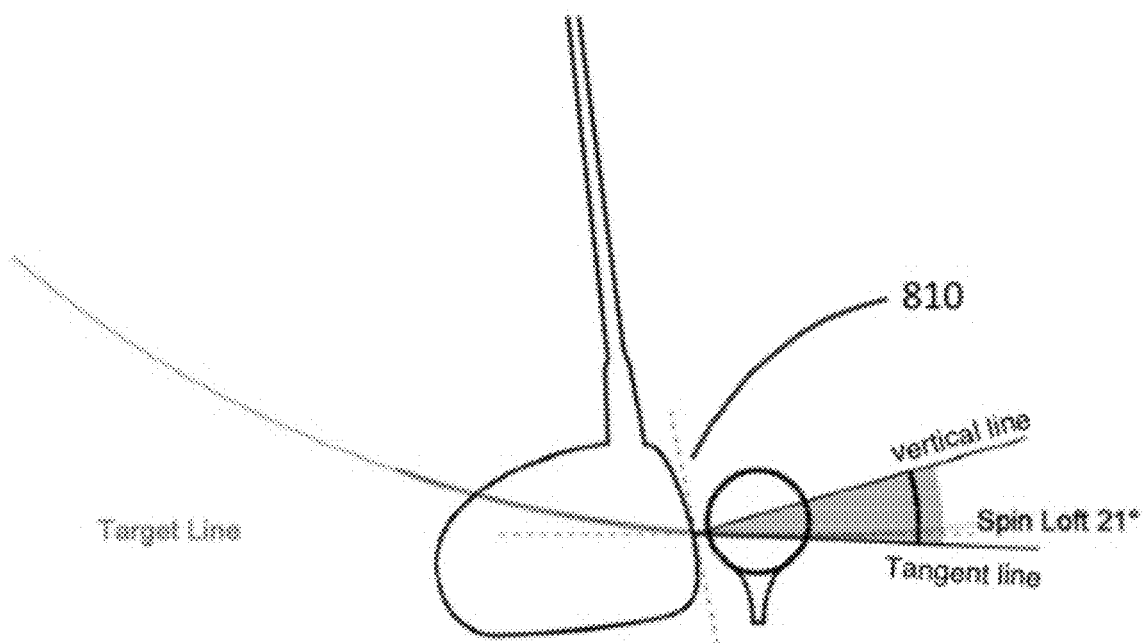
FIG. 26 illustrates a parameter of hitting planes of the club head.
Figure 27:
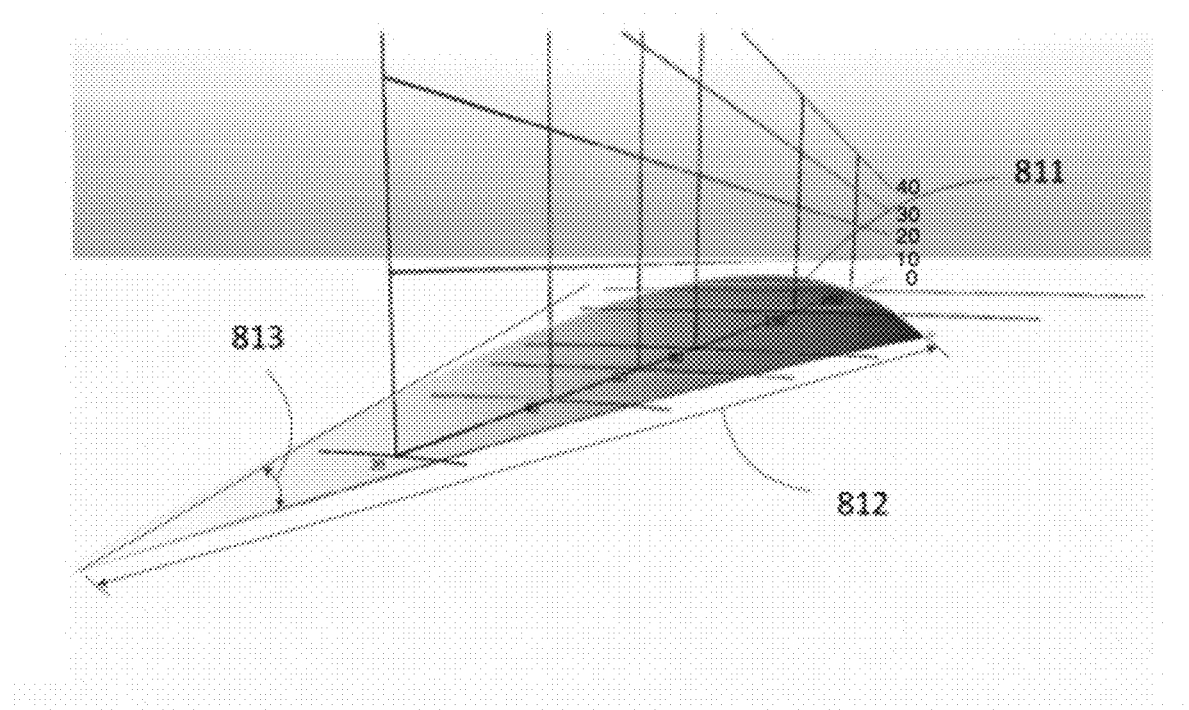
FIG. 27 illustrates a parameter of a ball trajectory.
Figure 28:
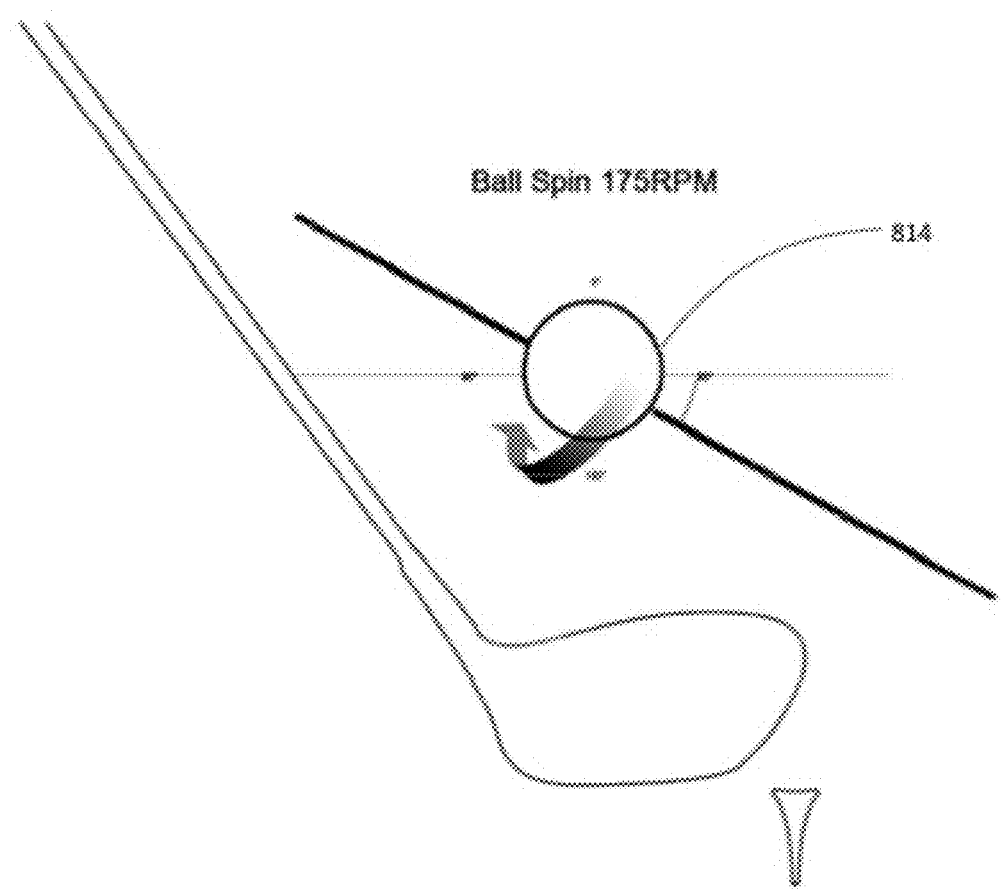
FIG. 28 illustrates a parameter of a ball rotation.
Figure 29:
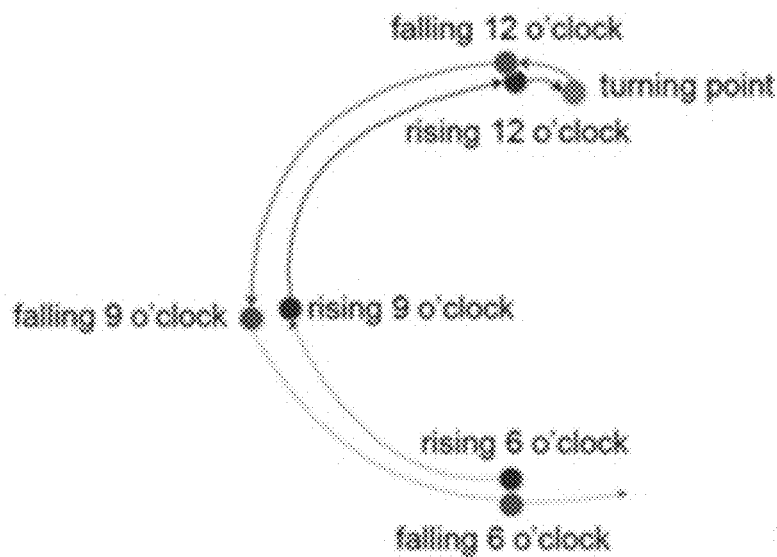
FIG. 29 illustrates analysis of a club head trajectory.
Figure 30:
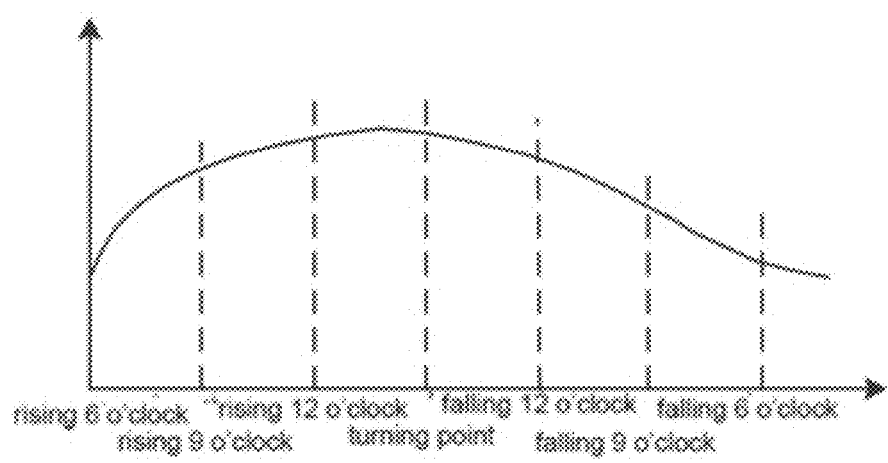
FIG. 30 is a pressure curve demarcated by time points of the club head trajectory.
Figure 31:
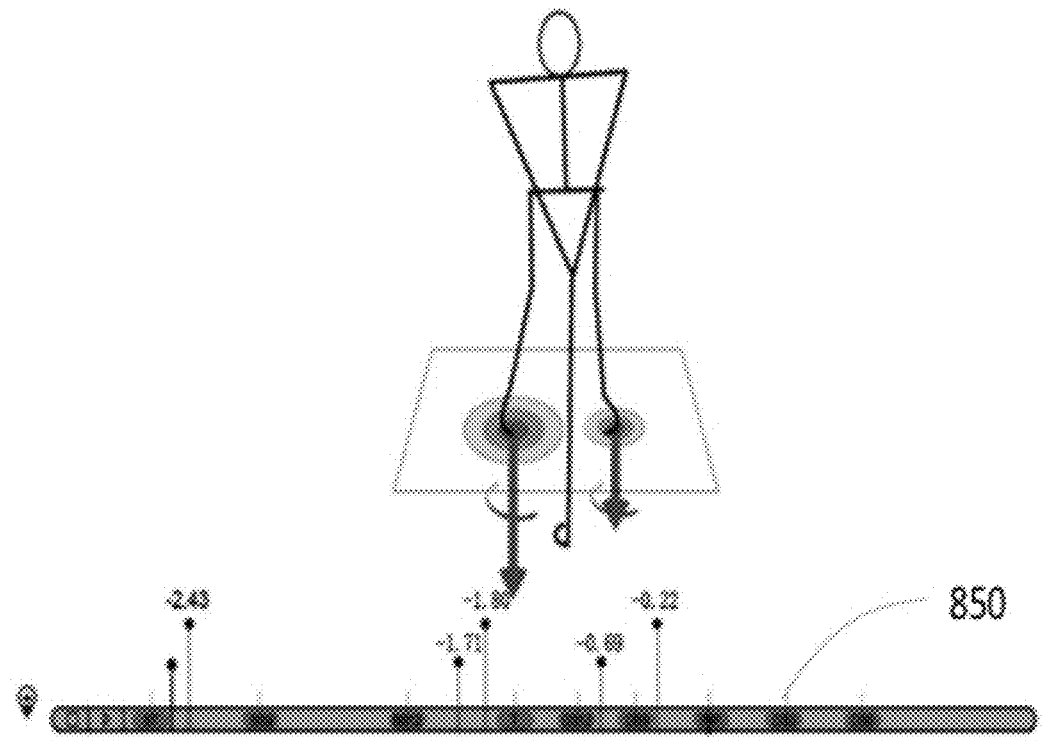
FIG. 31 illustrates the parameters in a same time coordinate.

Parameter synchronization between the human body model and the club trajectories is illustrated with an example of data synchronization between the club trajectories and the supporting forces of the feet. Referring to FIG. 25, the swing process is provided, wherein the club head trajectories are curves formed by a club rising process and a club falling process. FIG. 29 illustrates analysis of the club head trajectories. By analyzing at a club rising 6 o'clock direction, a club rising 9 o'clock direction, a club rising 12 o'clock direction, a turning point, a club falling 12 o'clock direction, a club falling 9 o'clock direction, a club falling 6 o'clock direction, and a club falling 3 o'clock direction, definite physical meanings such as being perpendicular to the ground, being parallel to the ground, and ball trajectory turning are found, which are able to be reference points of other data analysis. The time coordinate of each sensor is synchronized, so as to calibrating pressure curve data with time coordinates of such points as key time points, for obtaining a coordinate relationship between the supporting forces of the feet and the club trajectories. FIG. 30 is a pressure curve calibrated by time points of the club head trajectory. Data synchronization is provided between the human body model and the club trajectories, wherein parameters at key times are listed in a table, and a curve is able to be further generated according to the table. It should be noticed that the key points are also able to be obtained by analyzing the human body model. In addition, FIG. 30 illustrates the parameters in a same time coordinate 850, wherein a complete swing process is traced with the time coordinate 850. By clicking points on the time coordinate 850, the user is able to view the data at the key points.

Figure 32:
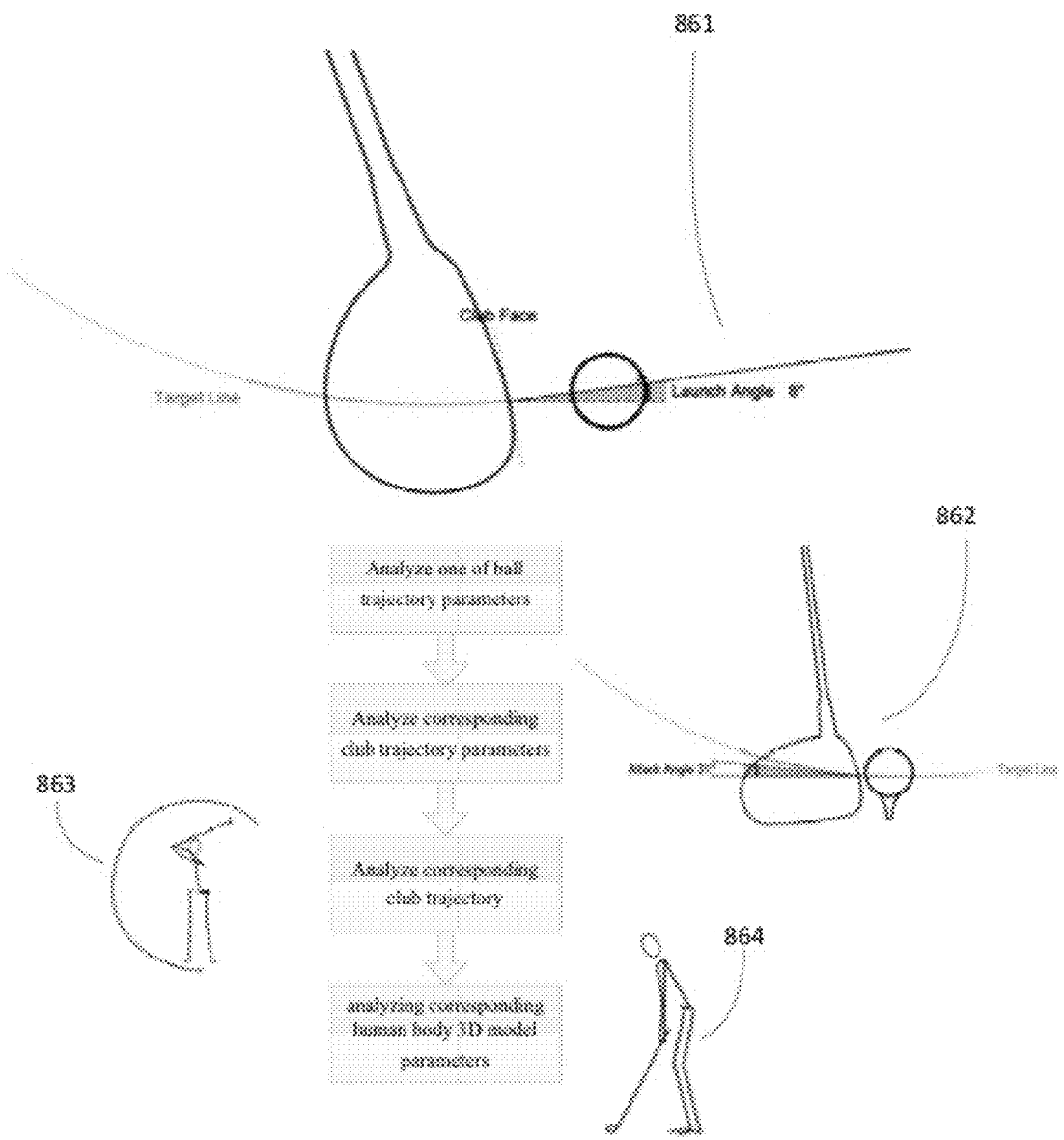
FIG. 32 illustrates an analyzing method for tracing the club trajectory according to the ball trajectory, and tracing the human body model as well as the pressures of the feet according to the club trajectory.

Analysis of the human body model, the club trajectories and the ball trajectories is focused on links therebetween. FIG. 32 illustrates an analyzing method for tracing the club trajectory according to the ball trajectory, and tracing the human body model as well as the pressures of the feet according to the club trajectory, wherein by adjusting the body lines (shoulder, hip, and arm moving directions and angles) of the human body model and the club trajectories, the ball trajectories are predicted, and a corresponding human body model and club trajectories are reversely traced according the ball trajectories. An object of the links is to limit ranges of a target club trajectory and the human body model. Another object of the links is to trace a mistake human body movement according to a mistake club trajectory which is traced by an insufficient ball trajectory.

The initial trajectory of the ball is applicable for analysis of ball parameters 861 with a plurality of parameter descriptions, such as a ball launch angle and a sufficient hitting process, wherein a size of the angle should be limited within a certain range. If a value of the angle differs from a reasonable value, hitting trajectory parameters 862 of the club head must be unreasonable. By further analyzing the hitting trajectory parameters 862, club head trajectory parameters, which affect the ball parameters 861, are obtained. Similarly, a club head trajectory 863 during swing is traced according to the hitting trajectory parameters 862, and human body posture changing parameters 864 are traced according to the club head trajectory 863 during swing, so as to establish a method for analyzing insufficient parameters.

Visual System

Figure 33:
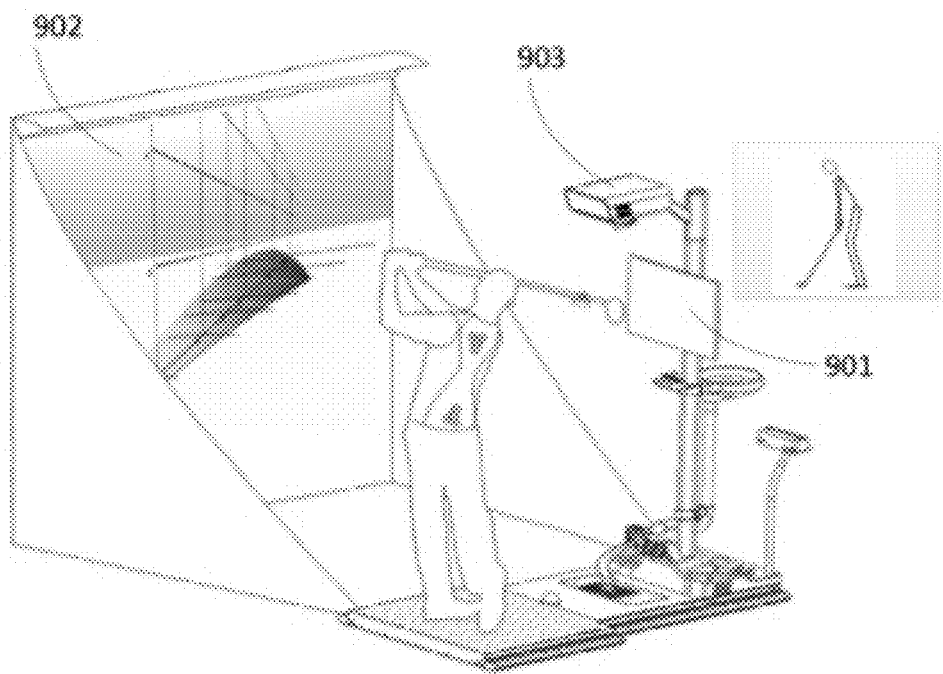
FIG. 33 illustrates a screen device and a projection device.

The visual device comprises: a displayer and a projection screen for providing two displaying modes. Furthermore, the displayer brings better operation experience and the projection screen provides better visual presentation. FIG. 33 illustrates a projection device, wherein the displayer is mounted in a direction facing the player, wherein the displayer presents the postures of the human body, replays a hitting process of a player, presents the club trajectories 103, and displays the initial flying trajectory and flying angles of the ball, and displaying a predicted flying trajectory of the ball. A projector is mounted above the hitting area. The projection screen corresponding to the projector is mounted along the hitting direction, wherein the projection screen displays a simulated course, and presents the flying trajectories of the ball in the simulated course.

The displayer is capable of presenting posture parameters of the human body, comprising spine tilt angles, arm tilt angles, leg tilt angles, head tilt angles, shoulder rotation angles, hip rotation angles, supporting force distribution of the feet, gravity center shift, and contact between the feet and the ground, which are presented by both images and values. The displayer is capable of replaying a hitting process of a player by a video method and a Kinect shadow method. The video method truly replays the hitting process, but is disturbed by a background. The Kinect shadow method captures the images and removing the background, so as to focus on presenting the human body movements. The displayer is capable of presenting the club trajectories, wherein the club head trajectories cooperates with the Kinect shadow method for replaying trajectory generation. The displayer is capable of generating the ball flying trajectories, comprising instruction of ball flying distance and jumping details. In addition, the displayer should provide data of the flying distance, the initial speed and the initial angle. The displayer is capable of providing the user with information of wrong postures, wherein the same mistake should be avoided in next swing. And the displayer is capable of displaying differences between different swings, which is quite important for improving player skills. On one hand, the player is able to compare the difference between the swings and focus on differences between a successful swing and a failure swing, so as to record the successful swing and avoid the failure swing. On the other hand, the player is able to compare differences with good players, for imitating swing postures of the good players, so as to improve swing techniques.

The projection screen is capable of displaying a simulated course, for providing a real hitting feeling. The simulated course should be consistent with environment settings of a real course, comprises holes, peaks, and boundaries, and equal to a real size of the real course. The simulated course may be completely fictional, or completely reproduce an existing course. Actually, reproducing the existing course means providing specific training thereof, so as to providing an intuitive feeling of the flying process of the ball. The projection screen is capable of presenting dynamic flying trajectories of the ball, wherein a plurality of visual angles are provided for viewing the ball flying trajectory, comprising an overlook view, a player view and a ball-tracking view. And the projection screen is capable of displaying history flying trajectories, which helps the player to analyze the link between the swing postures and the ball trajectories.

Laser Device

Figure 34:
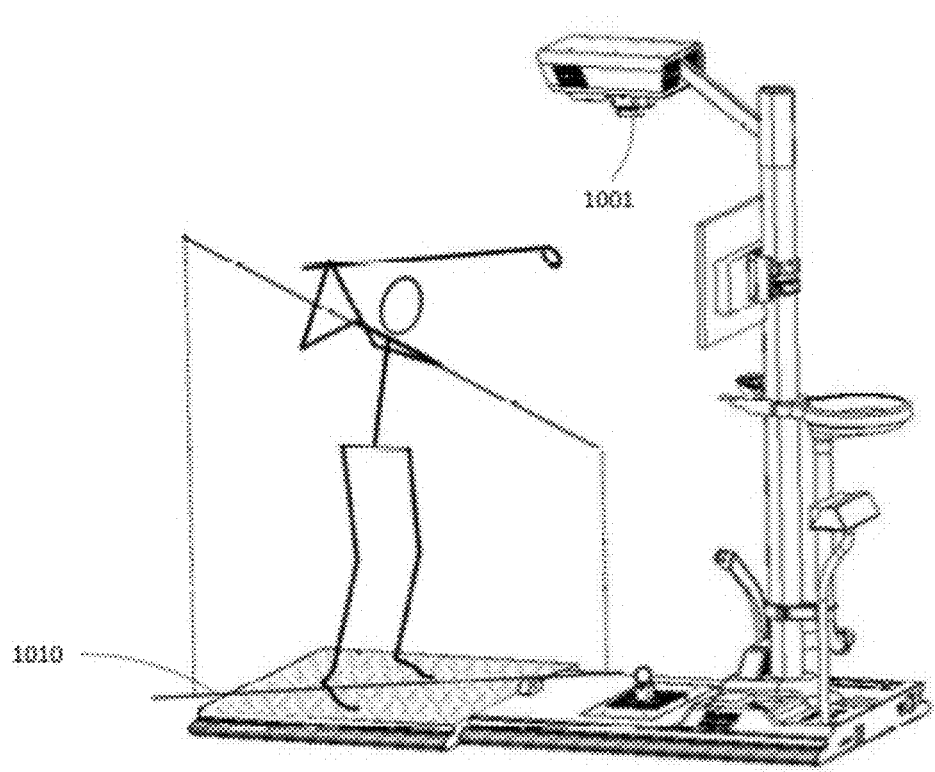
FIG. 34 illustrates a laser device.
Figure 35:
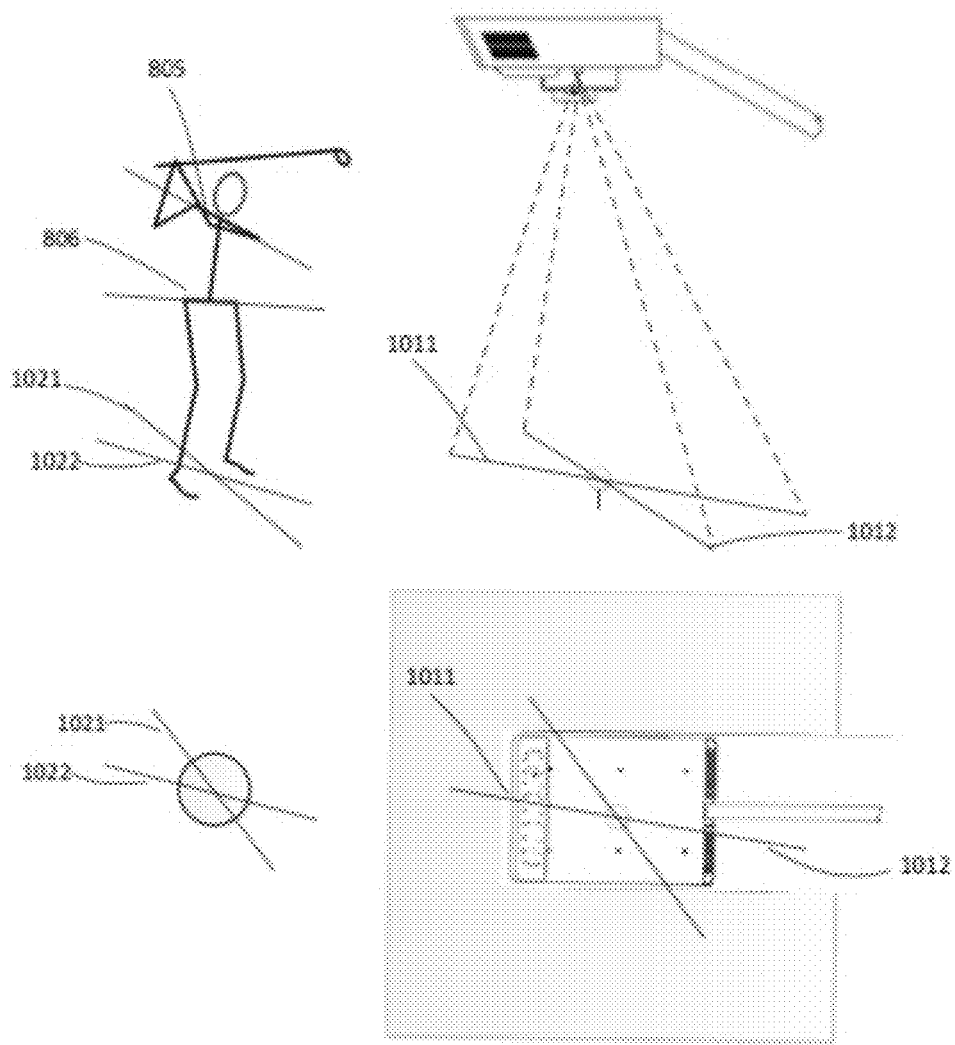
FIG. 35 illustrates real-time displaying the human rotation angle with a laser.
Figure 36:
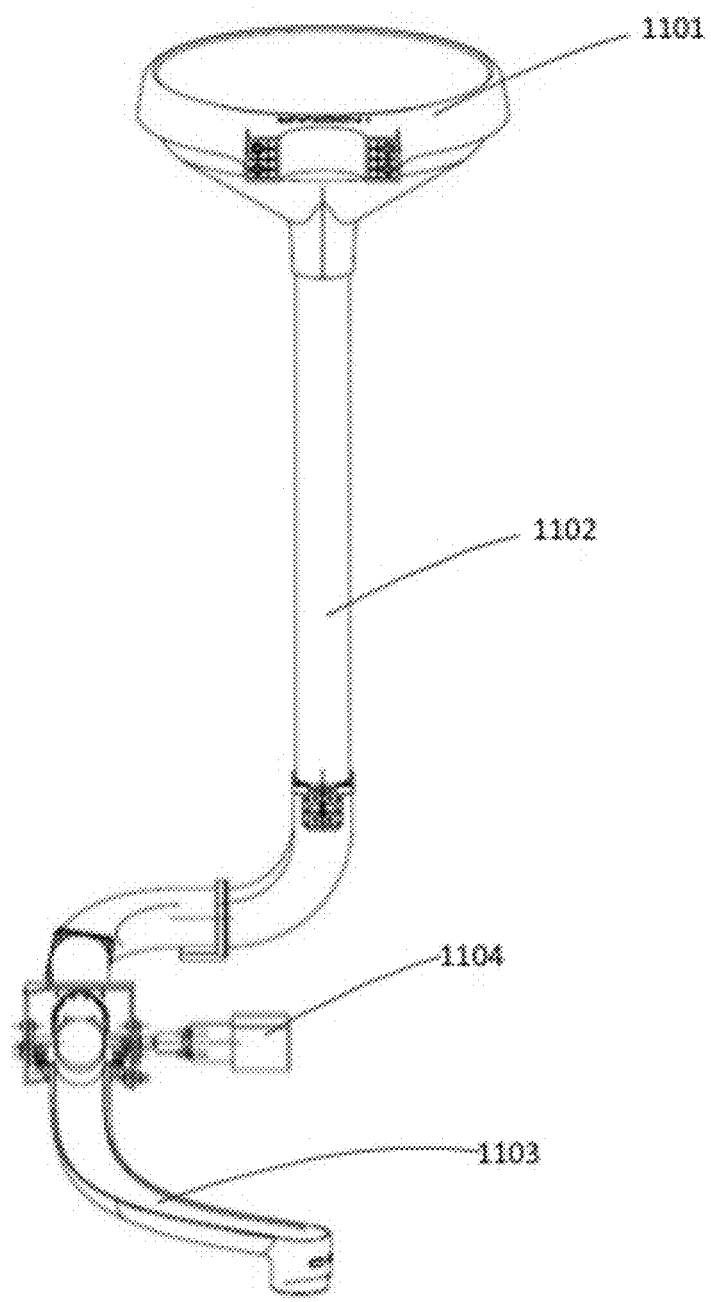
FIG. 36 is a structural view of a ball releasing mechanism.

A laser light 1001 is provided for presenting a human body rotation angle. For a high-quality hitting, an upper body rotation angle is an important parameter which is only visible by overlooking. The laser light 1001 projects a straight line 1010 on the ground, so as to real-time display a human body rotation angle within a human visual range. FIG. 34 illustrates real-time displaying the human rotation angle with a laser, wherein a line 1011 which real-time rotates with rotation of the shoulder and always keeps parallel to the projection of shoulder 1021 onto the ground, for showing real-time information of the shoulder rotation angle 805; wherein a line 1012 which real-time rotates with rotation of the hip and always keeps parallel to the projection of hip 1022 onto the ground, for showing real-time information of the hip rotation angle 806. By observing the line 1011 and the line 1012, the upper body rotation angle is clear to the player.

LED Strips

Two LED strips are provided for showing human gravity center distribution. For the high-quality hitting, the gravity center distribution is a key parameter for judging the human body postures. In the visual range, two LED strips are arranged on right and left sides for real-time displaying a supporting force ratio of right and left feet. Each of the LED strips comprises 32 LED lights, wherein light ratios of the LED strips represents the supporting force ratio of the right and left feet, which directly presents real-time information of the gravity center distribution between the feet. For example, when the supporting force is increased by 3.125%, one more LED light is turned on, in such a manner that when the supporting force ratio is 100%, all the 32 LED lights are turned on. The player is able to judge gravity center distribution conditions through the light ratios.

TEE Which is Able to Rise and Fall

Figure 38:
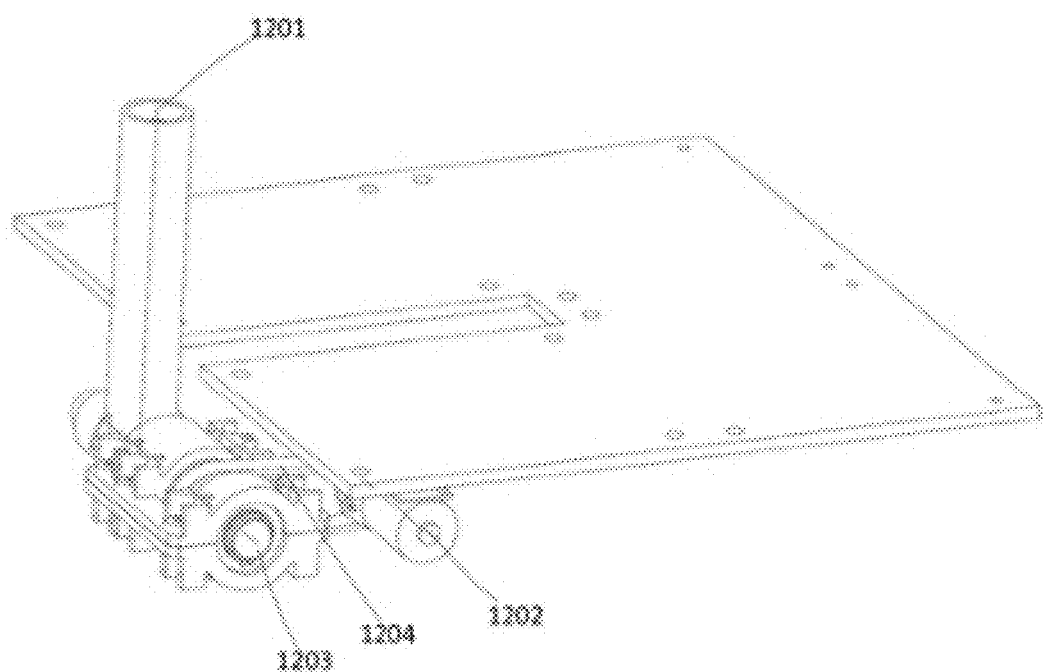
FIG. 38 is a structural view of a TEE which is able to move upwards and downwards.

The TEE structure is provided, in such a manner that the ball is able to be placed on the ground or the TEE. FIG. 38 is a structural view of a TEE which is able to move upwards and downwards. The TEE structure which is able to rise and fall comprises the TEE 1201, a shaft 1203, a belt 1204, a stepper motor 1202 and a sensor. Accordingly, the TEE is a pipe structure made of rubber, which recovers after being bent for avoiding damage of the TEE 1201 during swing. The stepper motor 1202 drives the TEE 1201 to move upwards or downwards through the belt 1204. When the club head hits down the TEE 1201, the belt 1204 ensures no damage to a transmission structure. The sensor detects whether the TEE 1201 is at a desired position, and when the TEE 1201 is at the desired position, the stepper motor is stopped. The TEE structure is arranged inside the rubber mat, in such a manner that the TEE structure is protected and a flat ground is provided. When the TEE 1201 rises, the ball drops into and stays in an opening of the pipe structure. When the TEE 1201 falls, the ball is limited by a hole on the ground.

Automatic Ball Output Mechanism

Figure 37A:
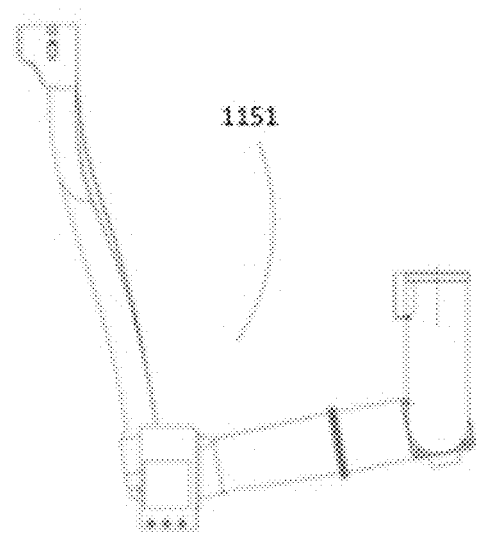
FIG. 37A illustrates a rising state of a rail of the ball releasing mechanism.
Figure 37B:
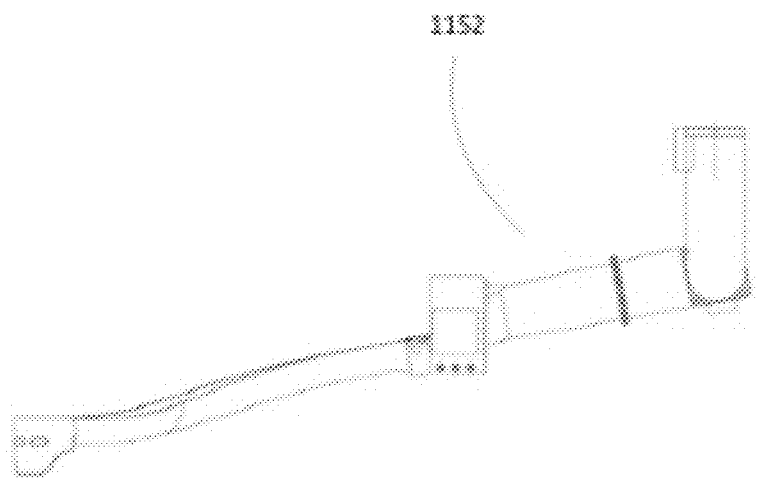
FIG. 37B illustrates a falling state of a rail of the ball releasing mechanism.

The ball releasing mechanism places a new ball on the hitting area after hitting. FIG. 37A and FIG. 37B illustrates a rising state and a falling state of the rail of the ball releasing mechanism, wherein the ball releasing mechanism comprises the ball storage, the rail 1103, the stepper motor 1104, and two sensors, wherein the ball storage comprises a pipe 1102 and a tray 1101; the rail 1103 is designed for ensuring only one ball each time; the pipe 1102 is transparent for observing a ball quantity; and an opening of the tray 1101 is large enough in such a manner that the ball is easy to drop in and a certain amount of balls are stored. A hook-shaped structure is provided at an input of the rail 1103, for ensuring only one ball each time. When the rail 1103 rises to an upper position 1152, the ball drops into the rail 1103. When the rail 1103 falls to a lower position 1153, the hook-shaped structure prevents a next ball from dropping into the rail 1103, and a proper angle is provide by the rail 1103 for releasing the ball. A buffer is provided at an output of the rail 1103 for smoothly placing the ball on the TEE 1201 or the ground. The stepper motor drives the rail to move upwards or downwards; the two sensors detects whether the rail is at a desired position, when the rail is at the desired position, the two sensors send a signal for stopping the stepper motor.

Golf Net and Mat

Two triangular golf nets 1301 are provided for preventing the ball from flying everywhere.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for analyzing a golf swing process, comprising steps of:

measuring 9-axis information of human body measuring points by a MEMS (micro-electro-mechanical system), wherein according to MEMS data, acceleration and angular velocity data of a human body are obtained; and by an integrating algorithm, club trajectories and human body rotation angles are obtained;

capturing space positions of a club head and a ball by infrared sensors, wherein according to infrared data, a ball initial flying trajectory, a ball initial flying speed, a ball initial flying angle, a hitting angle and speed of a club, and a club direction are calculated with detected space positions;

obtaining feet pressures and by a pressure sensor, and accumulating pressure data for calculating pressure values of feet, wherein forces and foot rotation in all directions are calculated with a differential algorithm;

capturing a body posture by a Kinect, wherein according to Kinect data, jitter points of skeleton data are removed with a filtering algorithm;

obtaining images of the club head and the ball by a camera, wherein the camera use pixel difference between frames for calculating the ball initial flying trajectory and rotation direction by an image processing algorithm;

calculating a complete ball flying trajectory according to the ball initial flying trajectory obtained by the infrared sensors and the camera;

according to measured data, calculating a human body 3D (3-dimensional) model, the feet pressures, the club trajectories and the ball trajectories by a processor;

synchronizing between the human body 3D model and the club trajectories, listing displaying human body 3D model parameters, feet pressure parameters and club trajectory parameters at key times in a table, and further generating curves thereof according to the table;

providing integrated display of the human body 3D model, the feet pressures, the club trajectories and the ball trajectories by displaying the human body 3D model parameters, the feet pressure parameters and the club trajectory parameters in one time coordinate;

predicting future ball trajectories by range limits of the human body 3D model and the club trajectories; and according to any one of ball trajectory parameters, analyzing corresponding club trajectory parameters which change the one of the ball trajectory parameters;

according to one of the corresponding club trajectory parameters, analyzing corresponding human body 3D model parameters and corresponding feet pressure parameters which change the one of the corresponding club trajectory parameters.

2. The method, as recited in claim 1, wherein the human body 3D model parameters, the feet pressure parameters, the club trajectory parameters and the ball trajectory parameters comprise:

the human body 3D model parameters: spine tilt angles, arm tilt angles, leg tilt angles, head tilt angles, shoulder rotation angles, and hip rotation angles;

the feet pressure parameters: feet supporting force distribution, gravity center shift, and contact of feet and a ground;

the club trajectory parameters: club rotation angles, club head moving speeds, club head directions, and club head space trajectories; and the ball trajectory parameters: a ball initial speed, a ball initial direction, ball initial spin, and ball space trajectories.

3. A system for analyzing a golf swing process, comprising:

a sensor system for simultaneously measuring human body movements, club head trajectories and ball trajectories, comprising:

an MEMS (micro-electro-mechanical system) connected to shoulders, a hip, wrists and a club for measuring movements and postures of a human body and a club;

a first infrared sensor and a second infrared sensor, wherein the first infrared sensor and the second infrared sensor are respectively placed under and in front of a hitting area of the ball for measuring angles, speeds and directions of the club and speeds as well as directions of a ball;

a pressure sensor for measuring a contact area of feet and a ground, forces on the feet, and rotation conditions of the feet;

a Kinect for capturing movements and postures of human body portions during swing; and a camera system for capturing an initial flying trajectory and a spin condition of the ball after hitting;

a processor connected to the sensor system for receiving data from the sensor system, wherein the processor synchronizes and processes the data for generating a human body 3D (3-dimensional) model, the club trajectories and the initial flying trajectory of the ball; so as to calculate a complete flying trajectory of the ball according to the initial flying trajectory; and a visual device connected to the processor for display of the data and visual presentation of analysis processes, wherein the visual device provides integrated display of the human body 3D model, feet pressures, the club trajectories and the ball trajectories, for tracing the club trajectories according to the ball trajectories, and tracing the human 3D model and the feet pressures according to the club trajectories; and the visual device displays the human body 3D model data, the feet pressure data and the club trajectory data in a same time coordinate.

4. The system, as recited in claim 3, wherein the MEMS comprises an MEMS motion sensor on a club head for measuring 9-axis information of the club head, and for transmitting club head data though a wireless communication protocol to the processor.

5. The system, as recited in claim 4, wherein the MEMS motion sensor is placed on a side of a club which is near the club head, wherein a fixing sleeve made of silicone or rubber provides a sufficient buffing effect while being a fixing device of the MEMS sensor.

6. The system, as recited in claim 4, wherein the MEMS motion sensor is placed on a back of the club head by gluing.

7. The system, as recited in claim 4, wherein the MEMS motion sensor is placed inside the club head, wherein the MEMS sensor is connected to an antenna attached to the club head for transmitting the data, or connected to a metal shell of the club head as the antenna.

8. The system, as recited in claim 3, wherein the MEMS motion sensor comprises an accelerometer, a gyroscope and a magnetometer, wherein the MEMS sensor is respectively connected to the shoulders, the hip, the wrists and a club head, with a sampling frequency of hundreds times per second.

9. The system, as recited in claim 3, wherein the first infrared sensor comprises a first infrared launcher which launches a first infrared light to a first infrared receiving area; the second infrared sensor comprises a second infrared launcher which launches a second infrared light to a second infrared receiving area;

wherein when the first infrared light launched to the first infrared receiving area is blocked, the first infrared sensor detects the club trajectories and the initial flying trajectory from a different angle; when the second infrared light launched to the second infrared receiving area is blocked, the second infrared sensor detects the club trajectories and the initial flying trajectory from a different angle.

10. The system, as recited in claim 9, wherein the first infrared receiving area comprises a first ball trajectory detecting area, a club trajectory detecting area, a club position detecting area, a ball position detecting area, and a ball output detecting area; the second infrared receiving area comprises a second ball trajectory detecting area, and second club trajectory detecting areas, for collecting corresponding data.

11. The system, as recited in claim 3, wherein the pressure sensor simultaneously measures contacting contours of the feet, stress relative distribution and stress absolute values, wherein the pressure sensor comprises a plurality of pressure sensor modules, and each of the pressure sensor modules comprises:

a load pressure sensor for measuring absolute values of pressures, wherein the load pressure sensor is arranged at a bottom of the pressure sensor as a supporting structure of the entire pressure sensor for providing complete supporting;

a membrane pressure sensor for measuring contours of the feet and the stress relative distribution, wherein the membrane pressure sensor is arranged at a top surface of the pressure sensor for directly providing a pressure detecting point, a soft material covers the membrane pressure sensor for protecting and packaging the membrane pressure sensor without changing pressure distribution applied on the membrane pressure sensor;

a mechanical connection between the load pressure sensor and the membrane pressure sensor, wherein the membrane pressure sensor provides a suitable placing face and a suitable connection structure for the load pressure sensor, so as to completely transmitting the pressures to the load pressure sensor; or the membrane pressure sensor directly covers the load pressure sensor; and a shell for packaging, wherein the shell is directly connected to and supports the load pressure sensor, and only provides a vertical supporting force to the load pressure sensor; the shell limits a horizontal displacement of the mechanical connection between the load pressure sensor and the membrane pressure sensor; and the shell provides a mechanical connection structure between the pressure sensor modules.

12. The system, as recited in claim 11, wherein the pressure sensor modules are mechanically connected with each other in parallel for measuring continuous regions, and the processor reads data of the pressure sensor modules in an assignment form.

13. The system, as recited in claim 11, wherein the membrane pressure sensor adopts an integrated membrane for measuring pressures within an area; wherein a plurality of membrane sensor detecting points are arranged on the integrated membrane, and each of the membrane sensor detecting points actually equals to a membrane sensor providing a measuring function; a circuit is integrated on the integrated membrane, and a flat cable is finally provided as an interface; portions of the integrated membrane are hollowed for containing the mechanical connection;
wherein the load pressure sensor adopts pressure strain sheets, wherein four pressure strain sheets are respectively arranged at four corners of the load pressure sensor for supporting the membrane pressure sensor and the connection structure;
wherein the mechanical connection comprises a hard board and a soft cushion, wherein the hard board provides a flat face for placing the integrated membrane, and the hard board is supported by the four pressure strain sheets; the soft cushion covers the integrated membrane, in such a manner that the integrated membrane is between the hard board and the soft cushion for being fixed and protected; and feet pressures are transmitted to the integrated membrane through the soft cushion; the hard board is connected to the soft cushion through a common mechanism comprising bolts, and the connection structure limits a horizontal position of the integrated membrane; and a horizontal position of the connection structure is limited by a shell thereof, while no vertical supporting force is directly provided by the shell;
wherein the shell fixes the four pressure strain sheets on the four corners, and limits horizontal positions of the membrane pressure sensor and the load pressure sensor as well as the horizontal position of the connection structure.

14. The system, as recited in claim 3, wherein the camera system comprises a detachable module, which comprises two left-side camera units and two right-side camera units, so as to observe the ball in different camera angles.

15. The system, as recited in claim 3, wherein the visual device comprises a projection device for projecting a straight line on a ground, so as to real-time display a human body rotation angle within a human visual range, wherein the straight line projected on the ground is a single line, is rotatable for presenting the human body rotation angle, and is within the human visual range;
wherein the projection device comprises a laser launcher.

16. The system, as recited in claim 15, wherein the processor collects human body posture data comprising should rotation angles and hip rotation angles; then the processor calculates an angle of the straight line projected according to collected data; and the processor controls the projection device, in such a manner that the straight line is parallel to a human body portion to be presented; this approach can also be applied to display real time motion of an object, such as object moving path and moving direction.

17. The system, as recited in claim 3, wherein the visual device comprises:
a displayer and a projection screen for providing two displaying modes;
wherein the displayer presents the postures of the human body, replays a hitting process of a player, presents the club trajectories, and displays the initial flying trajectory and flying angles of the ball, and displaying a predicted flying trajectory of the ball;
wherein the projection screen displays a simulated course, and presents the flying trajectories of the ball in the simulated course;
wherein display contents of the displayer and the projection screen are exchangeable, so as to displaying an enlarged swing process on the projection screen.

18. The system, as recited in claim 3, wherein the visual device comprises:
two LED strips for showing human gravity center distribution, wherein in a human visual range, the two LED strips are respectively arranged on right and left sides for real-time displaying a supporting force ratio of the feet;
wherein each of the two LED strips comprises n LED lights, wherein each of the n LED lights represents the supporting force ratio of (100/n) %, in such a manner that when the supporting force ratio is 100%, all the n LED lights are turned on.

19. The system, as recited in claim 3, further comprising:
a rubber mat where the ball is placed, wherein strips with different sizes and directions are distributed within the rubber met for simulating grass; and
a T-shaped supporting structure arranged inside the rubber mat, comprising a T-shaped supporting nail, a stepper motor and a sensor, wherein the stepper motor moves the T-shaped supporting nail upwards, in such a manner that the T-shaped supporting nail extends out of the rubber mat for switching between placing the ball on the rubber mat and on the T-shaped supporting nail; the sensor detects whether the T-shaped supporting nail is at a desired position, and when the T-shaped supporting nail is at the desired position, the stepper motor is stopped.

20. The system, as recited in claim 3, further comprising:
a ball releasing mechanism, comprising a ball storage, a rail, a stepper motor, and two sensors, wherein the ball storage comprises a pipe and a tray; the rail is designed for ensuring only one ball each time; the stepper motor drives the rail to move upwards or downwards; the two sensors detects whether the rail is at a desired position, when the rail is at the desired position, the two sensors send a signal for stopping the stepper motor;
wherein the rail is driving by the stepper motor for moving downwards to release the ball, and moves upwards after placing the ball for avoiding interference of ball hitting.

* * * * *